United States Patent
Yamada et al.

(10) Patent No.: US 6,999,241 B2
(45) Date of Patent: Feb. 14, 2006

(54) ZOOM LENS, AND VIDEO CAMERA AND DIGITAL STILL CAMERA USING THE ZOOM LENS

(75) Inventors: Katsu Yamada, Matsubara (JP); Keizo Ishiguro, Nara (JP); Tsuyoshi Kakimoto, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/505,284

(22) PCT Filed: Feb. 24, 2003

(86) PCT No.: PCT/JP03/01960

§ 371 (c)(1),
(2), (4) Date: Aug. 19, 2004

(87) PCT Pub. No.: WO03/071332

PCT Pub. Date: Aug. 28, 2003

(65) Prior Publication Data

US 2005/0254137 A1 Nov. 17, 2005

(30) Foreign Application Priority Data

Feb. 25, 2002 (JP) .............................. 2002-048425

(51) Int. Cl.
*G02B 15/14* (2006.01)

(52) U.S. Cl. ...................... 359/686; 359/557; 359/682; 359/683; 359/684; 359/685; 359/715; 359/740; 359/762; 359/781

(58) Field of Classification Search ................ 359/554, 359/557, 676, 680–686, 708, 715, 740, 762, 359/781
See application file for complete search history.

(56) References Cited

U.S. PATENT DOCUMENTS

| | | | | |
|---|---|---|---|---|
| 5,267,082 A | * | 11/1993 | Ono et al. | ................... 359/684 |
| 6,473,231 B1 | * | 10/2002 | Hamano et al. | ............. 359/557 |
| 6,728,482 B1 | * | 4/2004 | Hagimori et al. | ............. 396/72 |
| 2002/0024732 A1 | * | 2/2002 | Hamano et al. | ............. 359/557 |
| 2002/0063961 A1 | * | 5/2002 | Hamano et al. | ............. 359/557 |
| 2003/0161620 A1 | * | 8/2003 | Hagimori et al. | ............. 396/72 |
| 2004/0105020 A1 | * | 6/2004 | Iwasawa | ................... 348/240.3 |

FOREIGN PATENT DOCUMENTS

EP 1103834 5/2001

(Continued)

*Primary Examiner*—Evelyn A. Lester
(74) *Attorney, Agent, or Firm*—Hamre, Schumann, Mueller & Larson, P.C.

(57) ABSTRACT

A zoom lens, having a camera shake correction function, that is capable of preventing degradation of chromatic aberration while correcting camera shake, and can be small, light-weight and power-saving, is provided. The zoom lens is composed of four groups of lenses having positive, negative, positive and positive refractive powers, arranged in that order from an object side to an image plane side, where a second lens group conducts zooming and a fourth lens group conducts focus adjustment. The second lens group is made of a concave meniscus lens, a concave lens, a double convex lens, and a concave lens, arranged in that order from the object side to the image plane side, and it includes also at least one aspheric surface. A third lens group includes a cemented lens having a cemented surface whose convex surface faces the object side, and can be shifted in a perpendicular direction with respect to an optical axis in order to correct image fluctuations during a camera shake.

18 Claims, 23 Drawing Sheets

FOREIGN PATENT DOCUMENTS

| | | |
|---|---|---|
| JP | 7-128619 | 5/1995 |
| JP | 8-29737 | 2/1996 |
| JP | 2001-91830 | 4/2001 |
| JP | 2001-305426 | 10/2001 |

* cited by examiner

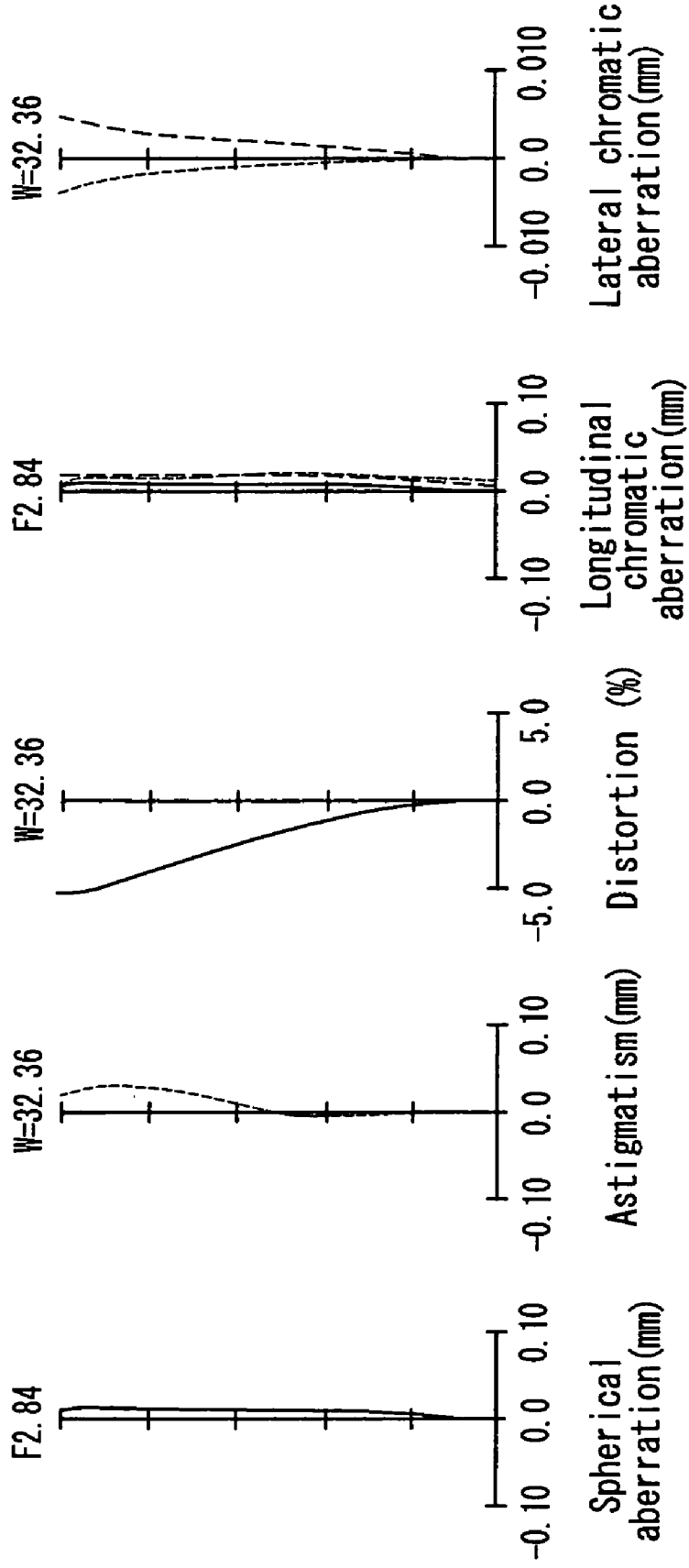

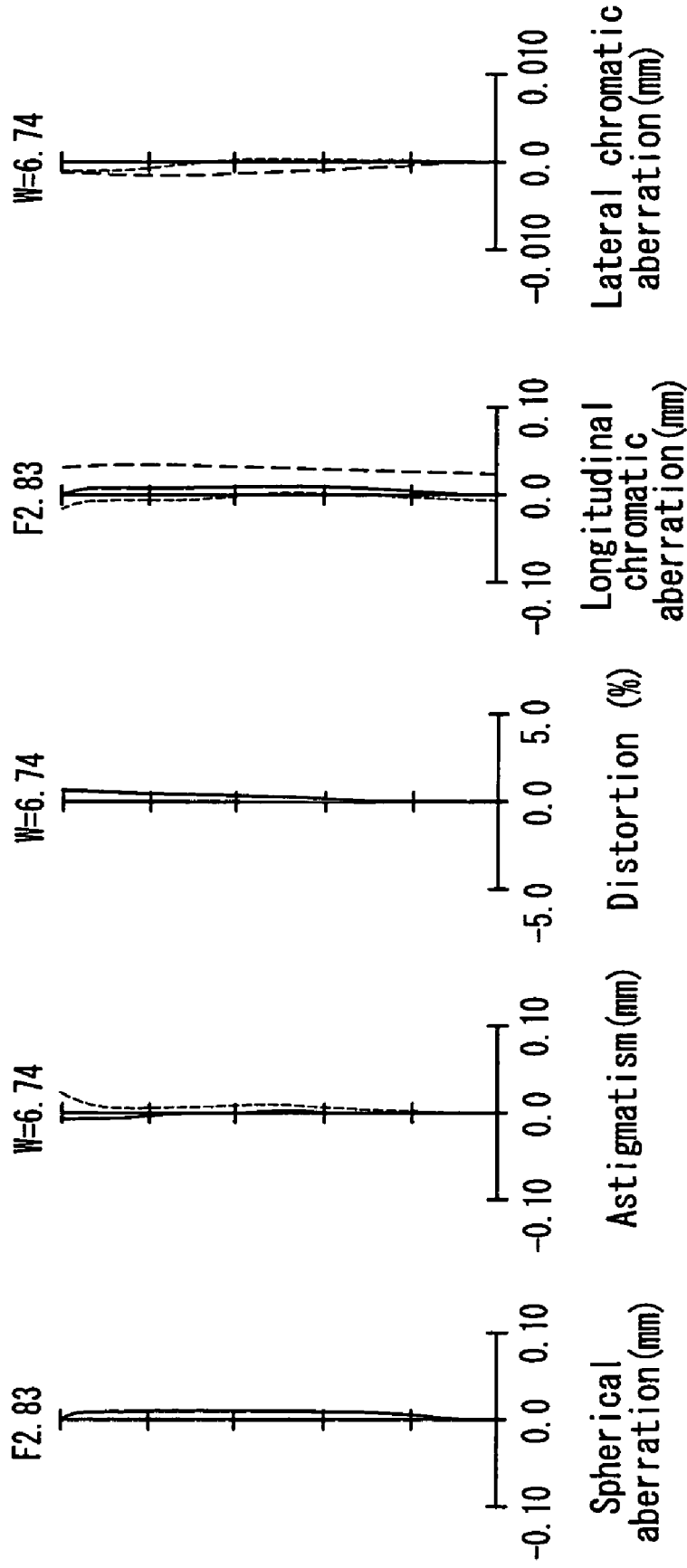

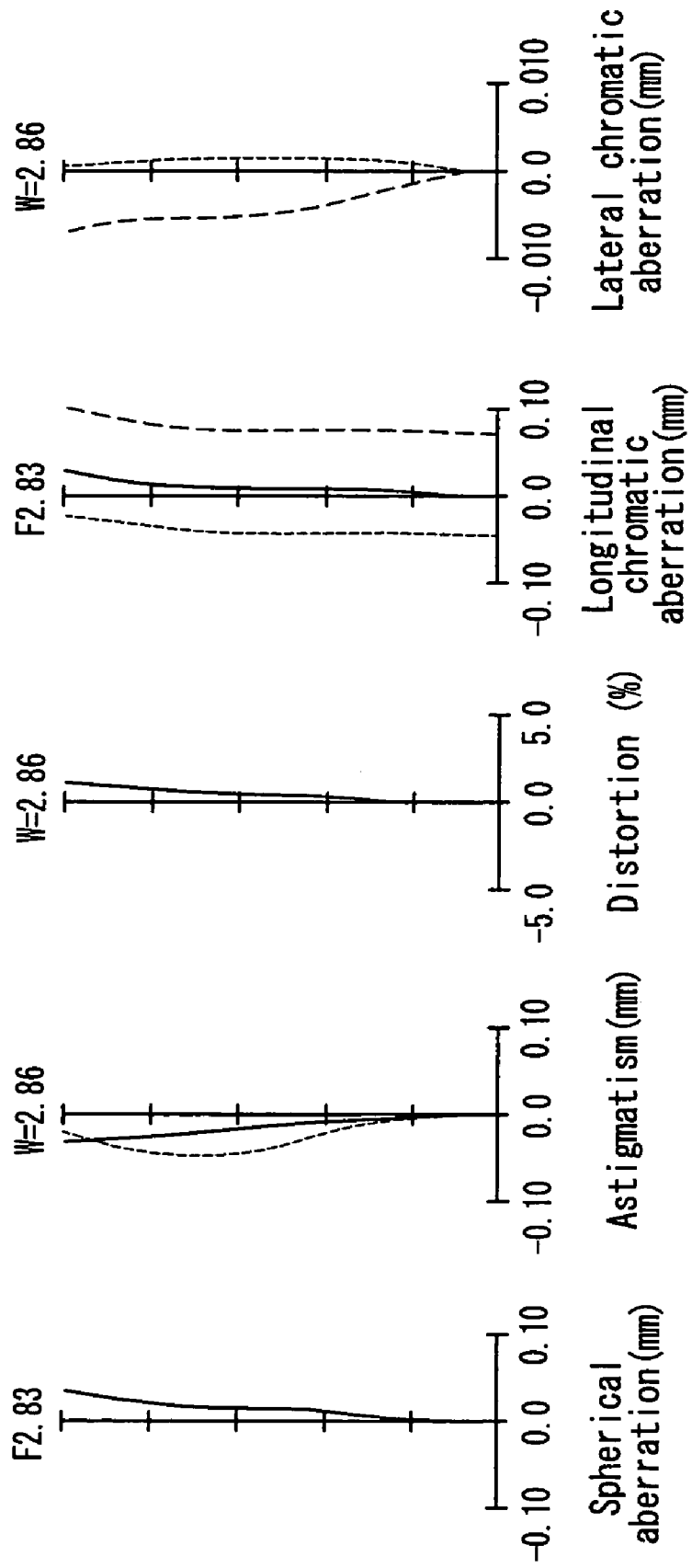

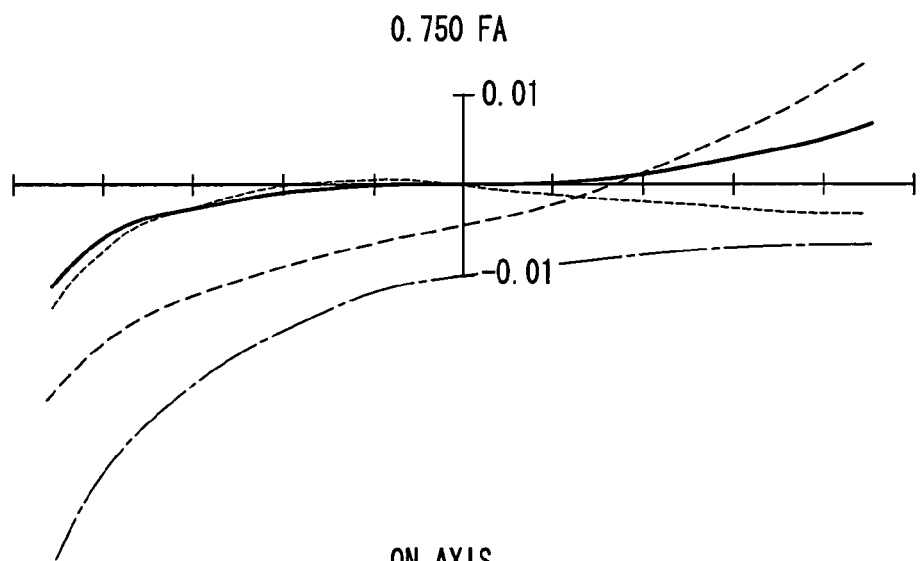
FIG. 7A  0.750 FA
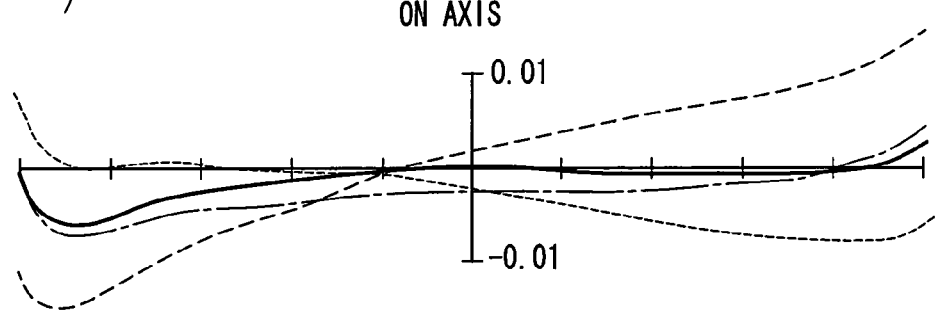
FIG. 7B  ON AXIS
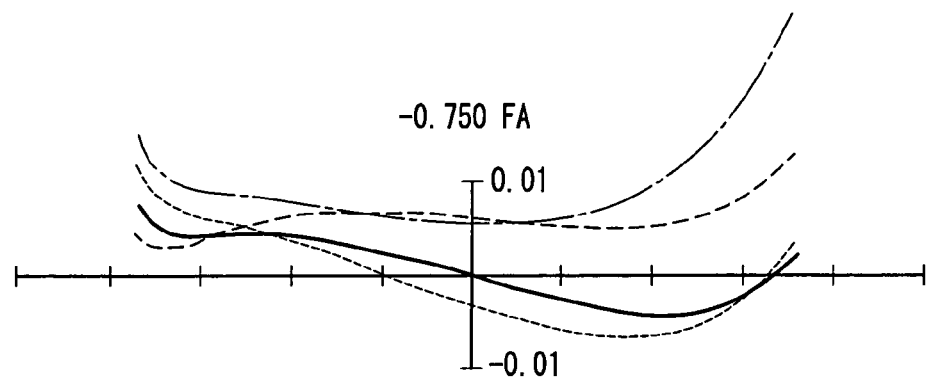
FIG. 7C  −0.750 FA

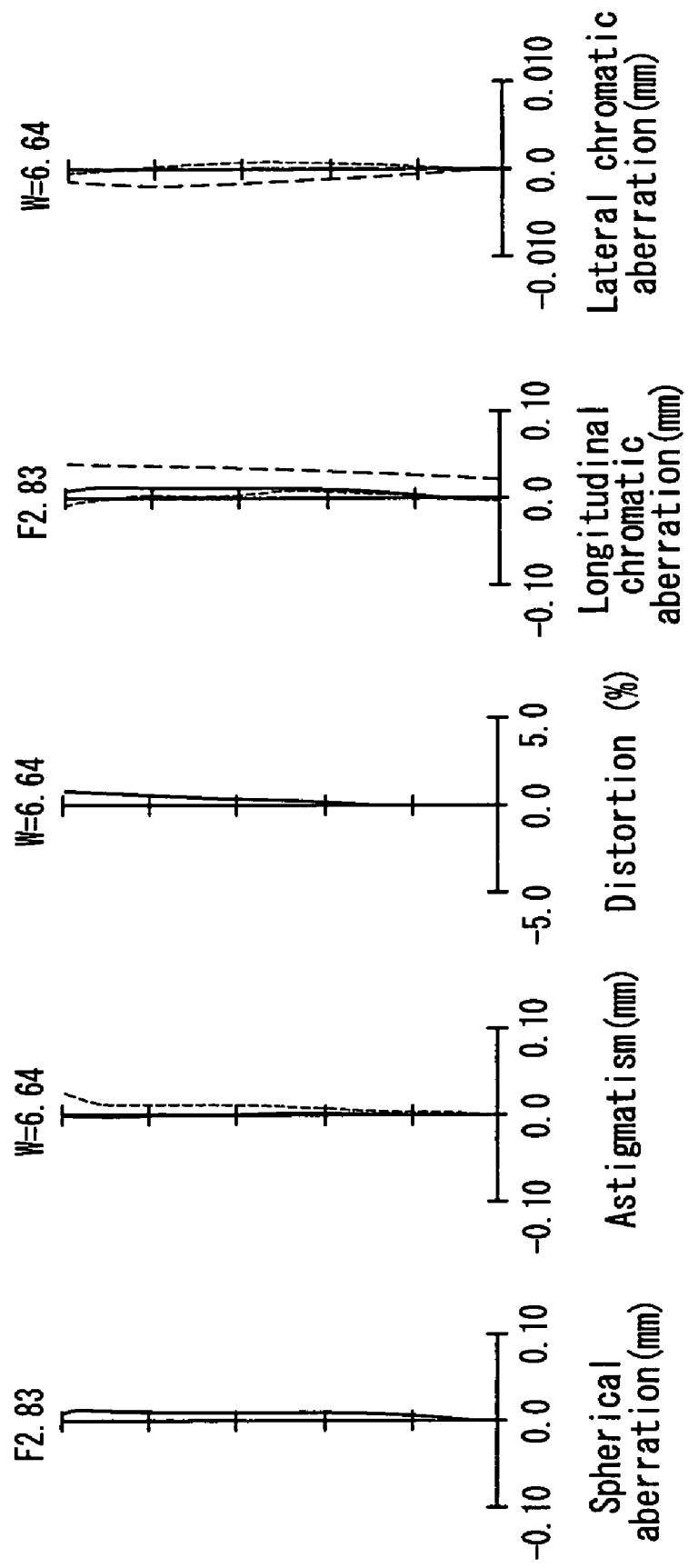

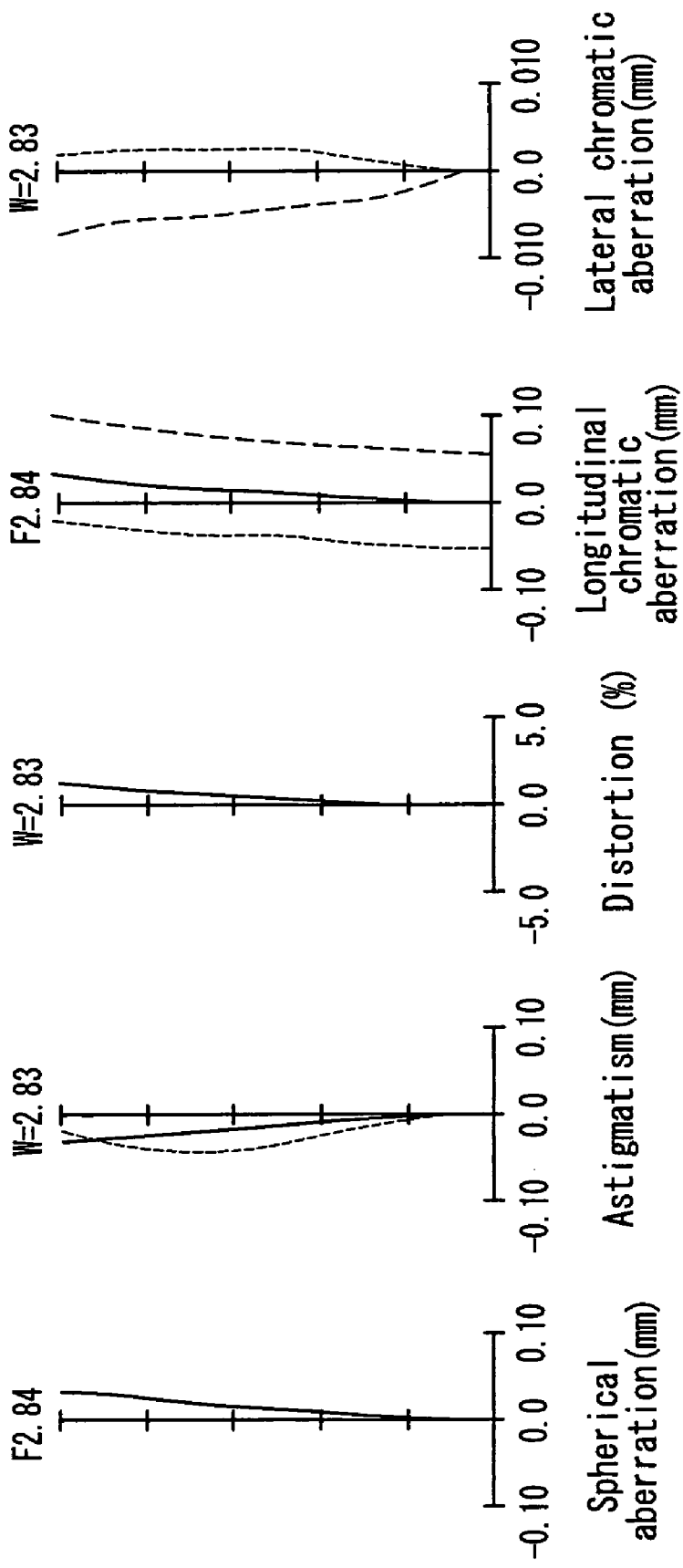

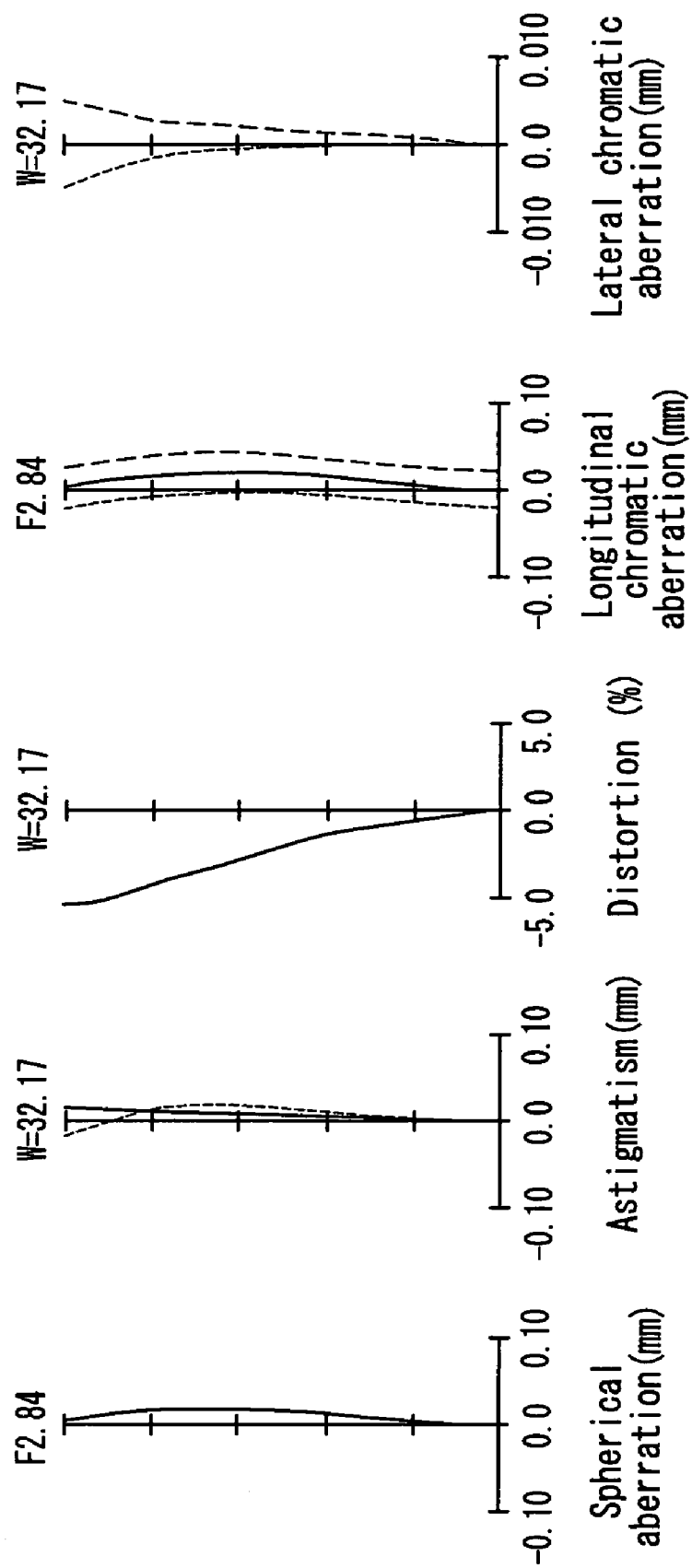

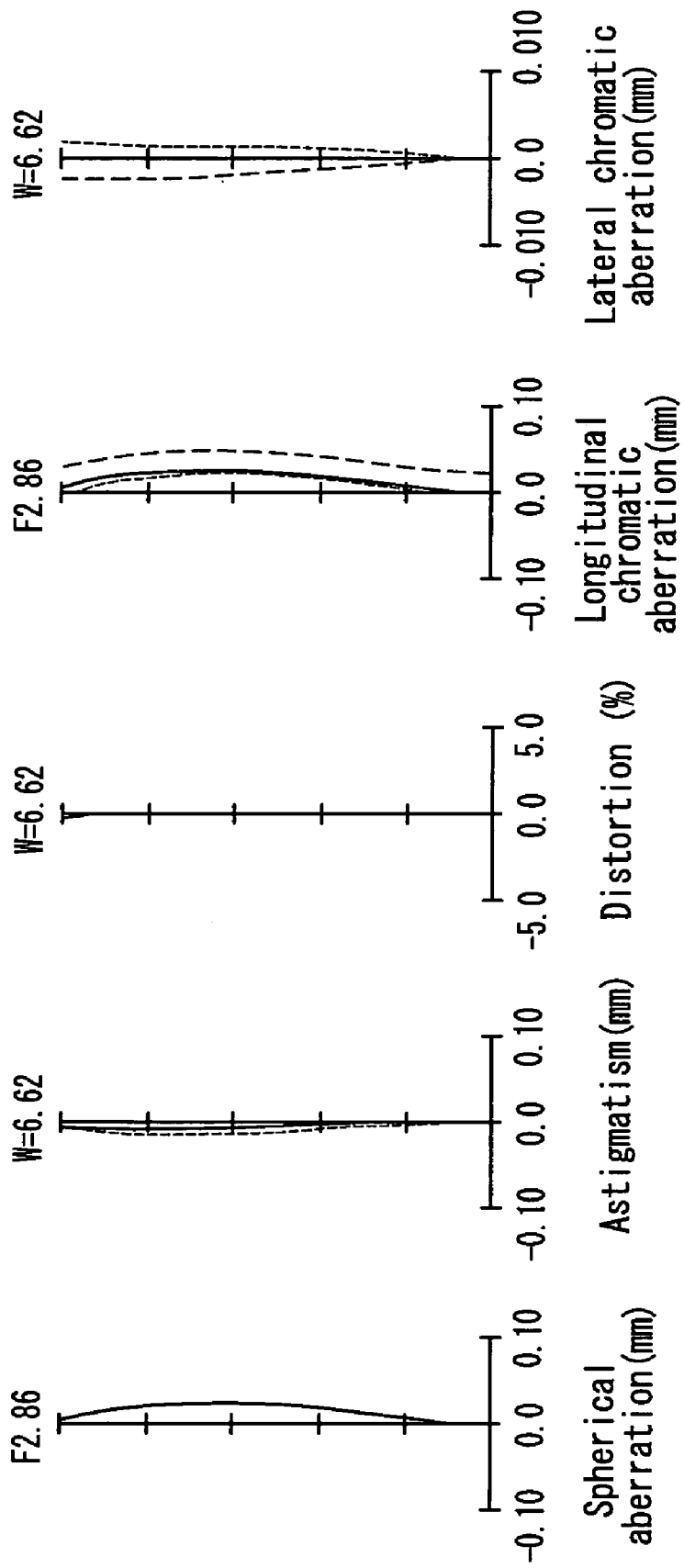

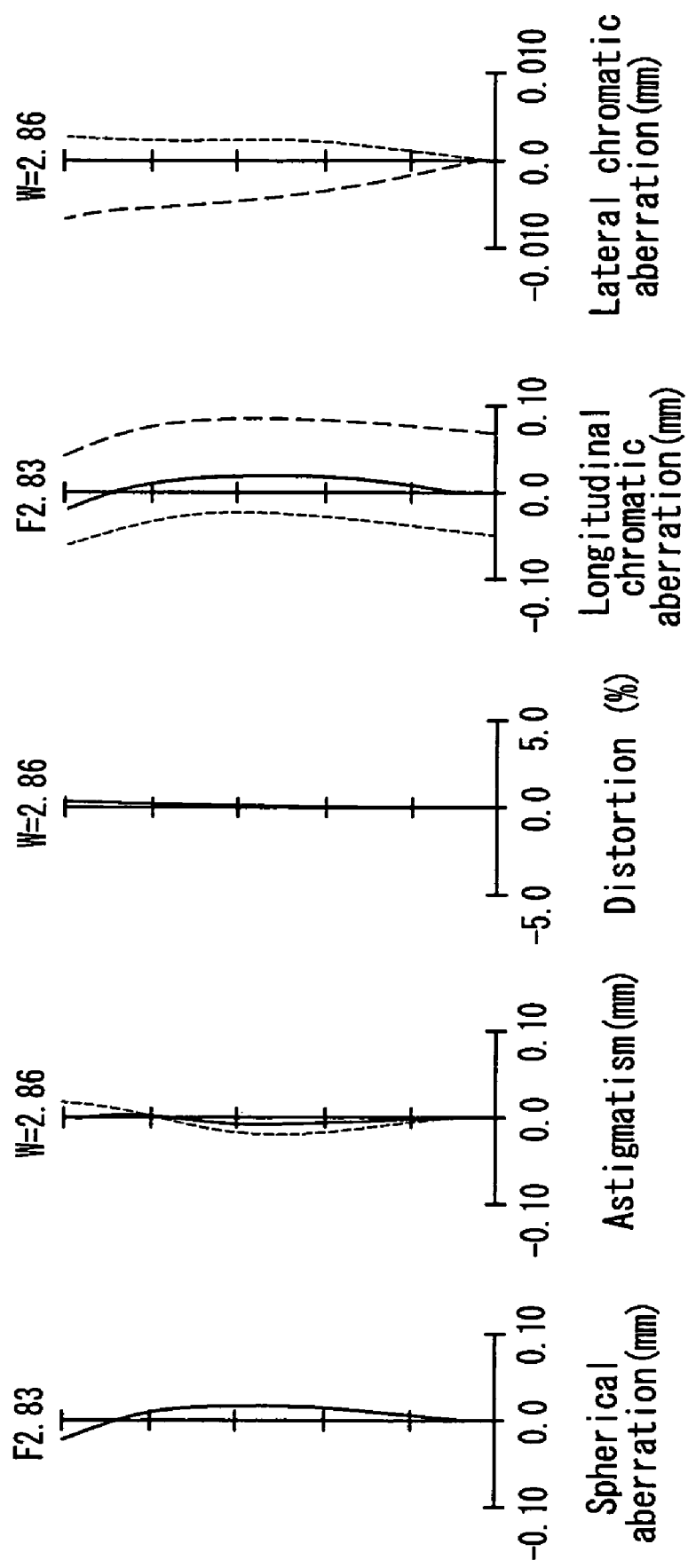

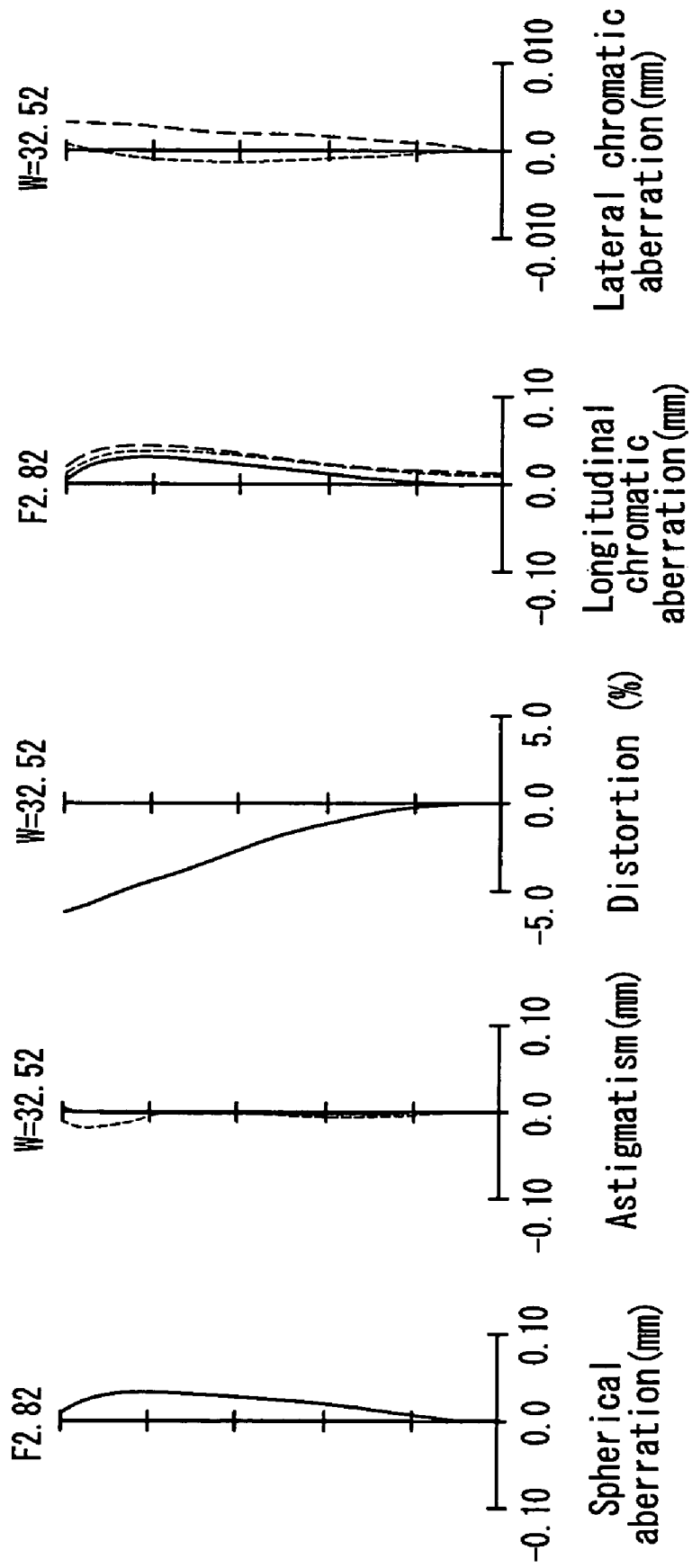

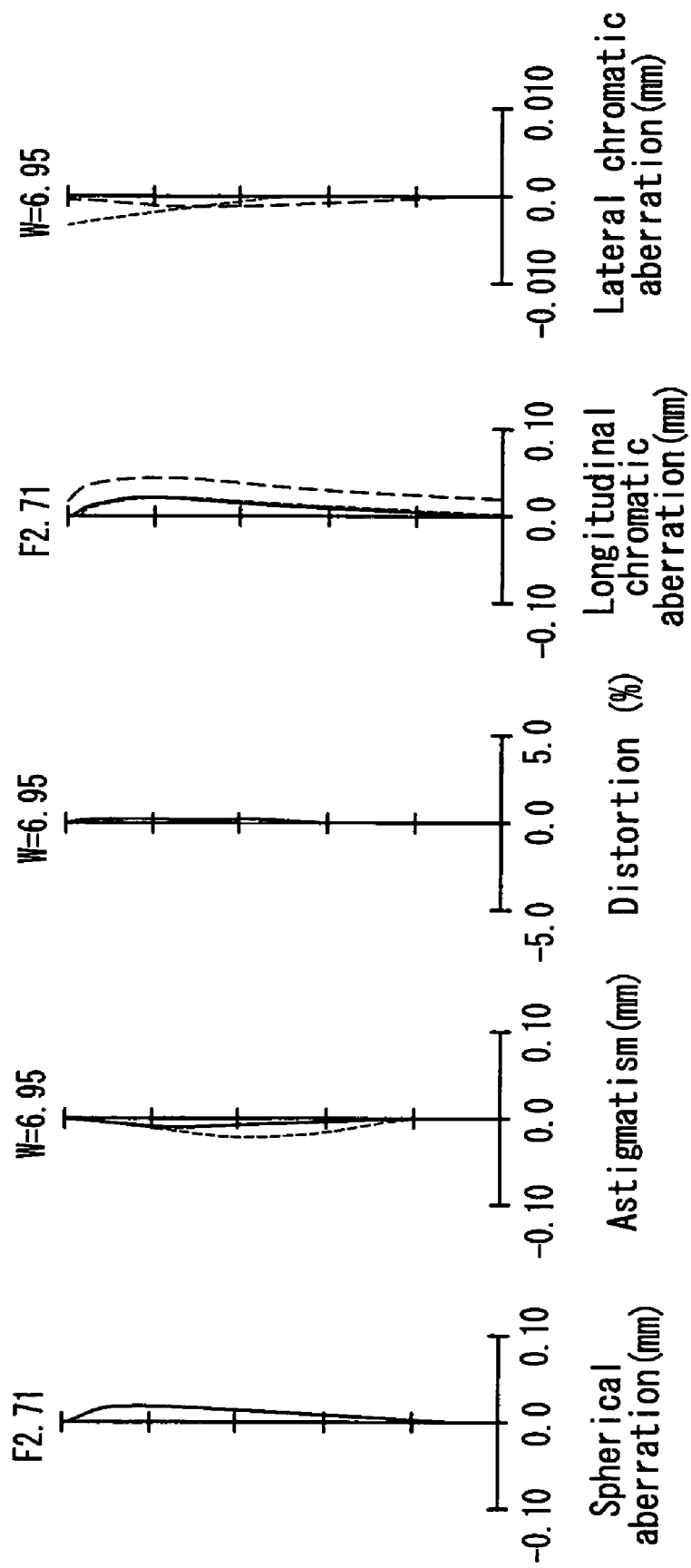

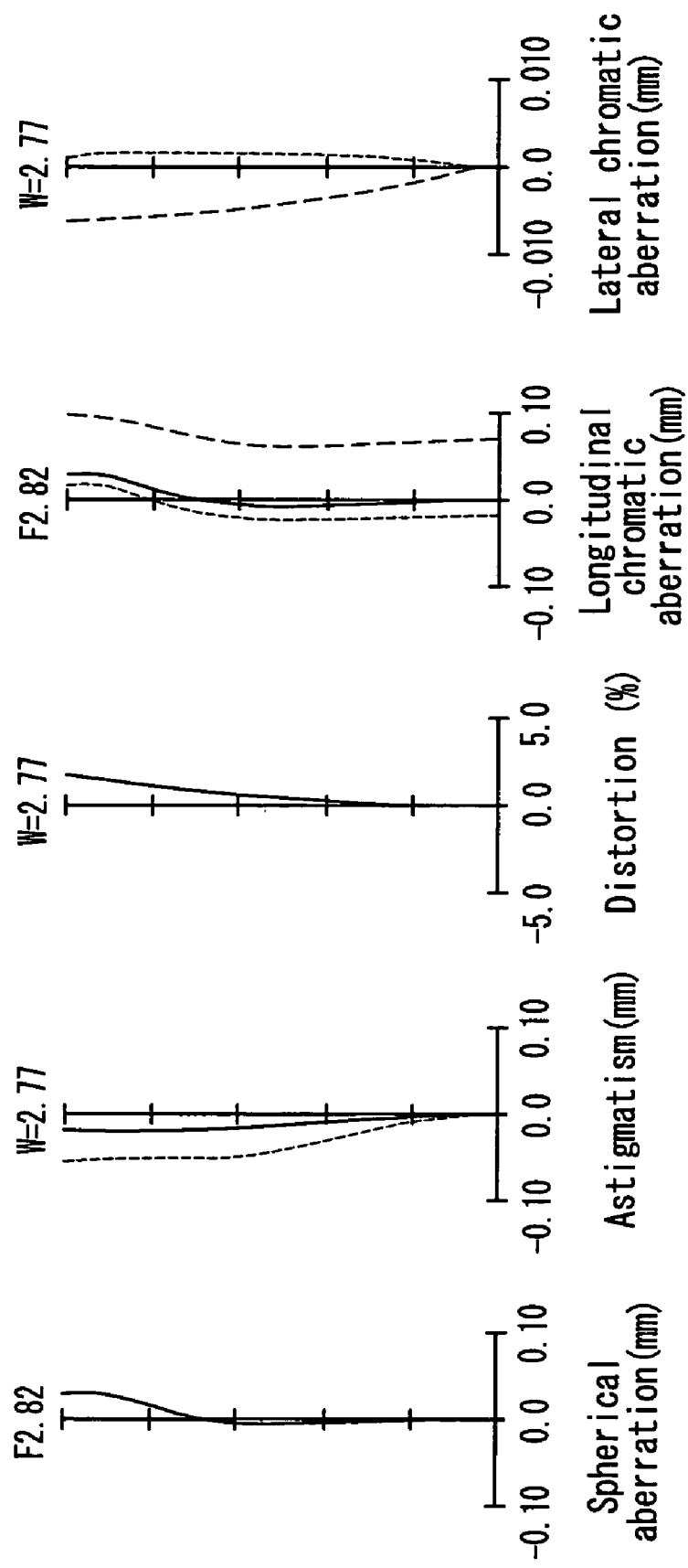

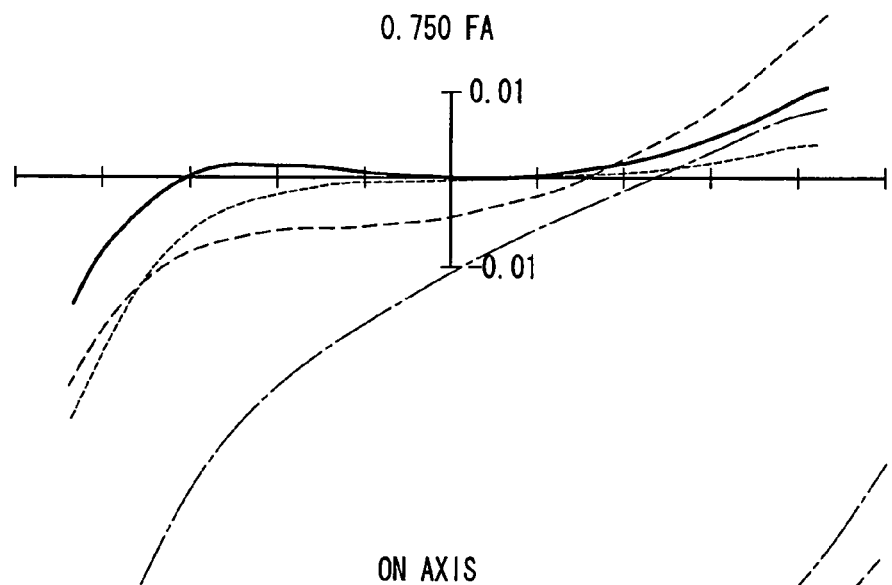
FIG. 21A  0.750 FA
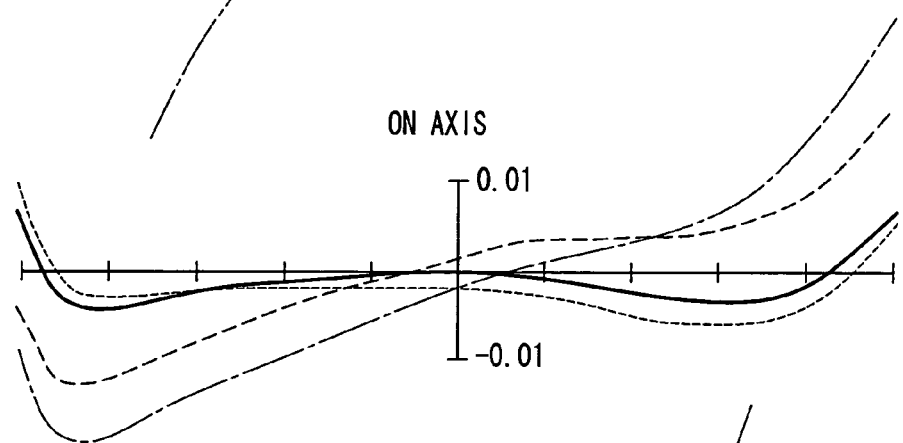
FIG. 21B  ON AXIS
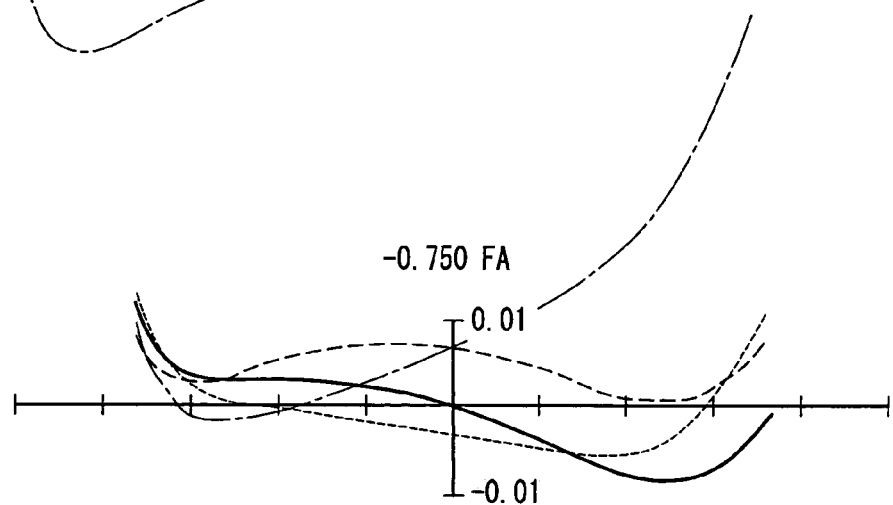
FIG. 21C  −0.750 FA

ZOOM LENS, AND VIDEO CAMERA AND DIGITAL STILL CAMERA USING THE ZOOM LENS

TECHNICAL FIELD

The present invention relates to a zoom lens that is used for a video camera or the like, and that is provided with a function for optically correcting image shake caused by camera shake or vibrations; and a video camera and a digital still camera using such a zoom lens.

BACKGROUND ART

In recent years, in imaging systems such as video cameras, an anti-shake function that prevents vibrations such as camera shake has become indispensable, and various types of anti-shake optical systems have been proposed.

For example, in the video camera disclosed in JP H8-29737A, an optical system for correcting camera shake made of two lenses is placed in front of a zoom lens, and image fluctuations due to camera shake are corrected by shifting one of those lenses perpendicularly with respect to the optical axis.

In the video camera disclosed in JP H7-128619A, a zoom lens made of four lens groups is used, and image fluctuations due to camera shake are corrected by shifting a part of the third lens group made of a plurality of lenses perpendicularly with respect to the optical axis.

However, in the video camera disclosed in JP H8-29737A, since the optical system for correcting camera shake is placed in front of the zoom lens, the lens diameter of the optical system for correcting camera shake becomes large. As a consequence, the video camera itself also becomes larger, and the load on the driving system becomes larger, which is disadvantageous with regard to making the video camera smaller and lighter, and reducing its power consumption.

Furthermore, in the video camera disclosed in JP H7-128619A, image fluctuations due to camera shake are corrected by shifting perpendicularly with respect to the optical axis some of the lenses of the third lens group that is fixed with respect to the image plane, so that it is advantageous with regard to size compared to video cameras in which the optical system for correcting camera shake is placed in front of the zoom lens, but since a part of the third lens group is moved, degradation of chromatic aberration during correction of camera shake cannot be avoided.

DISCLOSURE OF INVENTION

It is an object of the present invention to solve the above-described problems of the related art, and to present a zoom lens composed of four lens groups, in which camera shake can be corrected by shifting a third lens group that is fixed as a whole with respect to the image plane, in a perpendicular direction with respect to the optical axis when zooming and focusing. The zoom lens also can prevent degradation of chromatic aberration during correction of camera shake. The present invention presents a video camera and a digital still camera using this zoom lens, which can be smaller in size, lighter in weight and power-saving.

In order to attain this object, a first configuration of a zoom lens in accordance with the present invention includes:

a first lens group that includes a lens having negative refractive power and a lens having positive refractive power, as well as a lens having positive refractive power, arranged in that order from an object side to an image plane side, the first lens group having an overall positive refractive power and being fixed with respect to an image plane;

a second lens group having an overall negative refractive power, a zoom operation being carried out by shifting the second lens group on an optical axis;

an aperture stop that is fixed with respect to the image plane;

a third lens group that is made of a lens having positive refractive power, as well as a lens having a positive refractive power, and a lens having negative refractive power, arranged in that order from the object side to the image plane side, the third lens group having an overall positive refractive power and being fixed with respect to the optical axis direction when zooming or focusing; and a fourth lens group that is made of a lens having positive refractive power, a lens having negative refractive power and a lens having positive refractive power, arranged in that order from the object side to the image plane side, the fourth lens group having an overall positive refractive power and being shifted on the optical axis so as to maintain the image plane that fluctuates when the second lens group is shifted on the optical axis and when the object moves, at a certain position from a reference plane;

wherein the second lens group is made of a concave meniscus lens, a concave lens, a double convex lens and a concave lens, arranged in that order from the object side to the image plane side, and includes at least one aspheric surface;

wherein the third lens group includes a cemented lens having a cemented surface whose convex surface faces the image plane side, the third lens group can be shifted in a direction perpendicular to the optical axis in order to correct image fluctuations during camera shake, and includes at least one aspheric surface; and wherein the fourth lens group includes at least one aspheric surface.

According to the first configuration of a zoom lens, a zoom lens having a function of correcting camera shake, which is also capable of preventing degradation of chromatic aberration during camera shake and can be smaller in size, lighter in weight and power-saving, can be provided.

Also, in the first configuration of the zoom lens of the present invention, it is preferable that the fourth lens group is made of a concave lens, a convex lens and a concave lens, arranged in that order from the object side to the image plane side, and that all of these lenses are cemented together.

It is also preferable in the first configuration of the zoom lens of the present invention that the fourth lens group is made of three lenses and that all of these lenses are cemented together, which satisfies conditions of the following Expressions (1) and (2) when $\tau_{370}$ indicates transmittance of light having a wavelength of 370 nm and $\tau_{380}$ indicates transmittance of light having a wavelength of 380 nm at a part of a lens where the thickness is 10 nm, the lens being the second in the fourth lens group when viewed from the object side.

$$0.02 < \tau_{370} < 0.2 \qquad (1)$$

$$0.2 < \tau_{380} < 0.55 \qquad (2)$$

By configuring the fourth lens group with three lenses, aberrations such as chromatic aberration can be corrected favorably. Also, since cementing all of the three lenses together corresponds to combining one lens, the tolerance can be relieved.

Expressions (1) and (2) define transmittance in an ultraviolet ray (UV) wavelength region of a lens positioned in the midst of the cemented lenses. For cementing three lenses, as shown in FIG. 1, two lenses first are cemented together, and then a third lens is cemented thereto. When cementing the third lens, the previously cemented parts are also UV-irradiated. This may lead to excessive UV irradiation, thereby degrading strength at the first cemented surfaces and thus it may result in peeling of the bonded surfaces. Therefore, regarding the material of the center lens, it is necessary to define the transmittance in the UV wavelength region. Above the upper limits of Expressions (1) and (2), the transmittance in the UV wavelength region is increased extremely, which will cause difficulty in favorably cementing the three lenses. On the contrary, below the lower limit of Expressions (1) and (2), sufficient UV irradiation for a permanent curing cannot be performed, and thus the previously cemented parts will have insufficient strength and may be peeled easily.

A second configuration of a zoom lens in accordance with the present invention includes:

a first lens group that includes a lens having negative refractive power and a lens having positive refractive power, as well as a lens having positive refractive power, arranged in that order from an object side to an image plane side, the first lens group having an overall positive refractive power and being fixed with respect to an image plane;

a second lens group having an overall negative refractive power, a zoom operation being carried out by shifting the second lens group on an optical axis;

an aperture stop that is fixed with respect to the image plane;

a third lens group that is made of a lens having positive refractive power, as well as a lens having positive refractive power and a lens having negative refractive power, arranged in that order from the object side to the image plane side, the third lens group having an overall positive refractive power and being fixed with respect to the optical axis direction when zooming or focusing; and a fourth lens group that is made of a lens having positive refractive power, a lens having negative refractive power and a lens having positive refractive power, arranged in that order from the object side to the image plane side, the fourth lens group having an overall positive refractive power and being shifted on the optical axis so as to maintain the image plane that fluctuates when the second lens group is shifted on the optical axis and when the object moves, at a certain position from a reference plane;

wherein the second lens group includes at least one aspheric surface;

wherein the third lens group is made of three single lenses including a convex lens, a concave lens and a convex lens, arranged in that order from the object side to the image plane side, and can be shifted in a direction perpendicular to the optical axis in order to correct image fluctuations during camera shake, and includes at least one aspheric surface; and wherein the fourth lens group is made of three single lenses and includes at least one aspheric surface.

According to this second configuration of a zoom lens, particularly by configuring the third and fourth lens groups with single lenses alone, the design parameter is increased to allow improvement of the performance.

A third configuration of a zoom lens in accordance with the present invention includes:

a first lens group that includes a lens having negative refractive power and a lens having positive refractive power, as well as a lens having positive refractive power, arranged in that order from an object side to an image plane side, the first lens group having an overall positive refractive power and being fixed with respect to an image plane;

a second lens group having an overall negative refractive power, a zoom operation being carried out by shifting the second lens group on an optical axis;

an aperture stop that is fixed with respect to the image plane;

a third lens group that is made of a lens having positive refractive power, as well as a lens having a positive refractive power, and a lens having negative refractive power, arranged in that order from the object side to the image plane side, the third lens group having an overall positive refractive power and being fixed with respect to the optical axis direction when zooming or focusing; and a fourth lens group being shifted on the optical axis so as to maintain the image plane that fluctuates when the second lens group is shifted on the optical axis and when the object moves, at a certain position from a reference plane;

wherein the second lens group is made of a concave meniscus lens, a double concave lens, a double convex lens and a convex lens, arranged in that order from the object side to the image plane side, and includes at least one aspheric surface;

wherein the third lens group is made of a double convex lens and also a cemented lens including a convex lens and a concave lens, arranged in that order from the object side to the image plane side, which can be shifted in a direction perpendicular to the optical axis in order to correct image fluctuations during camera shake and includes at least one aspheric surface; and wherein the fourth lens group is made of one convex lens and includes at least one aspheric surface.

According to the third configuration of the zoom lens, by configuring the fourth lens group with one convex lens, the manufacturing cost is lowered and the assembly tolerance can be relieved.

In the first to third configurations of the zoom lens of the present invention, it is preferable that the conditions of the following Expressions (3) and (4) are satisfied when RIH indicates image height, $f_1$ indicates a focal length of the first lens group, and $f_2$ indicates a focal length of the second lens group.

$$2.0 < |f_2/RIH| < 3.0 \quad (3)$$

$$0.16 < |f_2/f_1| < 0.22 \quad (4)$$

Expression (3) is a condition for appropriately defining the focal length of the second lens group and for realizing both high performance and size reduction. Since the required focal length varies depending on the frame size, it is normalized by a frame size. Above the upper limit of Expression (3), the variation in the aberration during a shift of the second lens group when zooming is relieved, but the shifting distance becomes large, thereby hindering the size reduction.

Expression (4) defines the focal length of the first lens group, which is required after Expression (3) is satisfied. Above the upper limit of Expression (4), the first lens group will have excessive power, resulting in flare. Particularly, flare of lower light beams will occur easily, from the standard position to the tele end. Below the lower limit of Expression (4), less flare will occur. However, since the power of the first lens group is weakened excessively, longitudinal chromatic aberration will occur easily at the tele end.

In the first to third configurations of the zoom lens of the present invention, it is preferable that the condition of the following Expression (5) is satisfied when $f_1$ indicates a focal length of the first lens group, and $f_{11-12}$ indicates a combined focal length of a first lens and a second lens of the first lens group viewed from the object side.

$$3.2 < f_{11-12}/f_1 < 5.0 \qquad (5)$$

Expression (5) is a condition for favorably correcting longitudinal chromatic aberration and coma aberration at the tele end. Above the upper limit of Expression (5), the power of the cemented surfaces will be weakened, and thus sufficient achromatism cannot be obtained. As a result, the longitudinal chromatic aberration at the tele end will be magnified. On the contrary, below the lower limit of Expression (5), since the power of the cemented surfaces will be excessively strong with respect to the entire focal length, coma flare will occur easily from the standard position to the tele end.

In the first to third configurations of the zoom lens of the present invention, it is also preferable that the condition of the following Expression (6) is satisfied when $f_{13}$ indicates a focal length of a third lens of the first lens group viewed from the object side, and $f_{132}$ indicates a focal length of a surface of the third lens of the first lens group, facing the image plane when viewed from the object side.

$$-2.5 < f_{132}/f_{13} < -1.5 \qquad (6)$$

Expression (6) is a condition for favorably correcting distortion and coma aberration. Above the upper limit of Expression (6), astigmatism is overcorrected, thereby enlarging a barrel distortion. Below the lower limit of Expression (6), coma flare will occur easily and enlarge a pin-cushion distortion.

In the first to third configurations of the zoom lens of the present invention, it is also preferable that the condition of the following Expression (7) is satisfied when $dsag_{2i1}$ indicates an aspheric amount at the 10% effective aperture of an $i^{-th}$ aspheric surface of the second lens group viewed from the object side, and $dsag_{2i9}$ indicates an aspheric amount at the 90% effective aperture of an $i^{-th}$ aspheric surface of the second lens group viewed from the object side.

$$-0.23 < dsag_{2i1}/dsag_{2i9} < -0.10 \qquad (7)$$

Expression (7) is a condition for favorably correcting coma aberration. In a case where an aspheric surface is used for the concave surface, above the upper limit of Expression (7), the aspheric amount in the vicinity of the effective aperture is decreased excessively, therefore coma flare of the lower light beams will not be corrected sufficiently, particularly at the periphery of the picture plane in a range from the wide-angle end to the standard position. On the contrary, below the lower limit of Expression (7), the coma flare is overcorrected. When an aspherical surface is used for a convex surface, the operation is performed in a reversed manner.

In the first to third configurations of the zoom lens of the present invention, it is also preferable that the aspheric surface of the second lens group is arranged the closest to the image plane side, and that the concave surface faces the image plane side. Since an off-axis principal light beam height becomes low on the surface of the second lens group arranged closest to the image plane, according to this preferred example, the coma aberration can be corrected without having much influence on the astigmatism. Moreover, since the concave surface faces the image plane side, the pin-cushion distortion occurring at a position between a wide-angle end and a standard position can be corrected favorably.

In the first to third configurations of the zoom lens of the present invention, it is also preferable that the condition of the following Expression (8) is satisfied when $dsag_{3i1}$ indicates an aspheric amount at the 10% effective aperture of an $i^{-th}$ aspheric surface of the third lens group viewed from the object side, and $dsag_{3i9}$ indicates an aspheric amount at the 90% effective aperture of an $i^{-th}$ aspheric surface of the third lens group viewed from the object side.

$$-0.24 < dsag_{3i1}/dsag_{3i9} < -0.15 \qquad (8)$$

Expression (8) is a condition for favorably correcting spherical aberration. The third lens group, at which the light flux has a large diameter, has a particularly great influence on the longitudinal performance. In a case where an aspheric surface is used for the convex surface, above the upper limit of the Expression (8), light beams on the axis are overcorrected. Below the lower limit of Expression (8), the light beams on the axis are corrected insufficiently. When an aspherical surface is used for a concave surface, the operation is performed in a reversed manner.

In the first to third configurations of the zoom lens of the present invention, it is also preferable that the condition of the following Expression (9) is satisfied when $dsag_{4i1}$ indicates an aspheric amount at the 10% effective aperture of an $i^{-th}$ aspheric surface of the fourth lens group viewed from the object side, and $dsag_{4i9}$ indicates an aspheric amount at the 90% effective aperture of an $I^{-th}$ aspheric surface of the fourth lens group viewed from the object side.

$$-0.45 < dsag_{4i1}/dsag_{4i9} < -0.13 \qquad (9)$$

Expression (9) is a condition for favorably correcting coma aberration. The fourth lens group has a great influence on performance of off-axis light beams, and particularly, performance of upper light beams. In a case where an aspheric surface is used for the convex surface, above the upper limit of Expression (9), the aspheric surface amount at the periphery is decreased excessively, therefore the off-axis upper light beams at the periphery of the picture plane is overcorrected. On the contrary, below the lower limit of Expression (9), the correction will be insufficient. When an aspherical surface is used for a concave surface, the operation is performed in a reversed manner.

In the first to third configurations of the zoom lens of the present invention, it is also preferable that the condition of the following Expression (10) is satisfied when RIH indicates an image height, $Sg_i$ indicates a specific gravity of each lens and $CL_i$ indicates a lens diameter of each lens in the third lens group.

$$\sum_{i=1}^{n}(Sg_i \cdot CL_i^2)/RIH < 50 \qquad (10)$$

The third lens group shifts as a whole in a direction perpendicular to the optical axis in order to correct fluctuations of the image during camera shake. When correcting the camera shake, for operating the lens group constantly, the power consumption is increased with the increase in weight. Since thrust is also necessary, a large-sized actuator is required. Expression (10) is a condition for formulating the weight of the third lens group. The lens weight is proportional to squares of the specific gravity and the lens diameter. The lens size varies depending on the image height, and since the size allowance of an applicable actuator will vary the lens size is normalized by the image height. Above the upper limit of Expression (10), both the lens barrel and the power consumption will be increased excessively.

A video camera according to the present invention is configured as a video camera having a zoom lens, where the zoom lens of the present invention is used.

A digital still camera according to the present invention is configured as a digital still camera having a zoom lens, where the zoom lens of the present invention is used.

BRIEF DESCRIPTION OF DRAWINGS

FIGS. 4A–4E show aberration graphs for the wide-angle end of the zoom lens in Example 1 of the present invention.

FIGS. 5A–5E show aberration graphs for the standard position of the zoom lens in Example 1 of the present invention.

FIGS. 6A–6E show aberration graphs for the tele end of the zoom lens in Example 1 of the present invention.

FIGS. 7A–7C show the aberration graphs during a camera shake correction at the tele end in Example 1 of the present invention.

FIGS. 9A–9E show aberration graphs for the standard position of the zoom lens in Example 2 of the present invention.

FIGS. 10A–11E show aberration graphs for the tele end of the zoom lens in Example 2 of the present invention.

FIGS. 13A–13E show aberration graphs for the wide-angle end of the zoom lens in Example 3 of the present invention.

FIGS. 14A–14E show aberration graphs for the standard position of the zoom lens in Example 3 of the present invention.

FIGS. 15A–15E show aberration graphs for the tele end of the zoom lens in Example 3 of the present invention.

FIGS. 18A–18E show aberration graphs for the wide-angle end of the zoom lens in Example 4 of the present invention.

FIGS. 19A–19E show aberration graphs for the standard position of the zoom lens in Example 4 of the present invention.

FIGS. 20A–20E show aberration graphs for the tele end of the zoom lens in Example 4 of the present invention.

FIGS. 21A–21C show the aberration graphs during a camera shake correction at the tele end in Example 4 of the present invention.

BEST MODE FOR CARRYING OUT THE INVENTION

The present invention will be explained below more specifically, by referring to some embodiments.

Figure 1A:
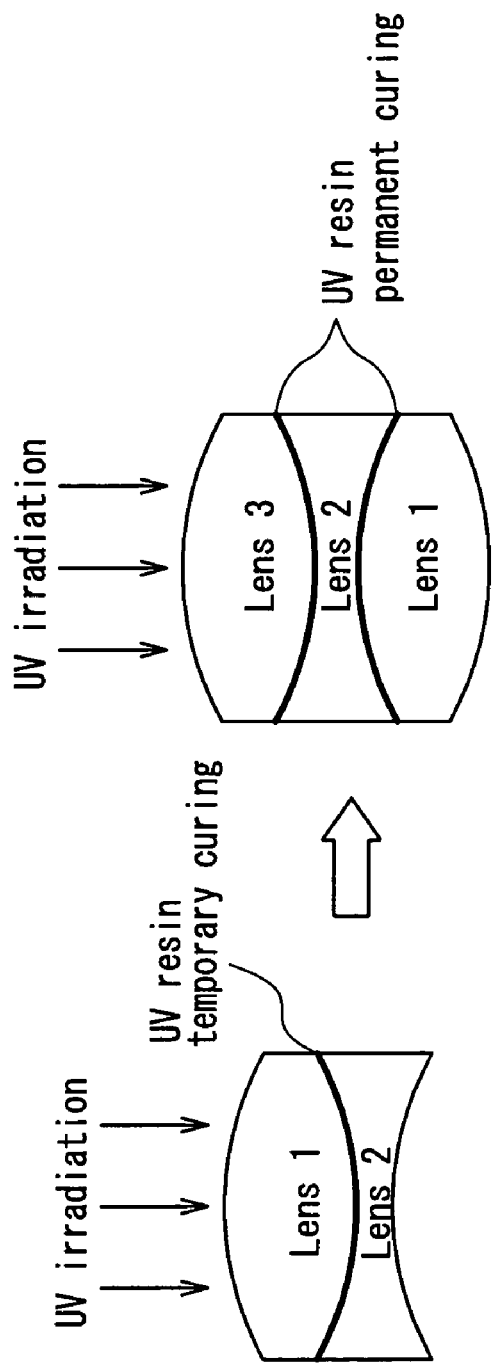
FIG. 1A and FIG. 1B are schematic views showing a method of cementing three lenses.
Figure 1B:
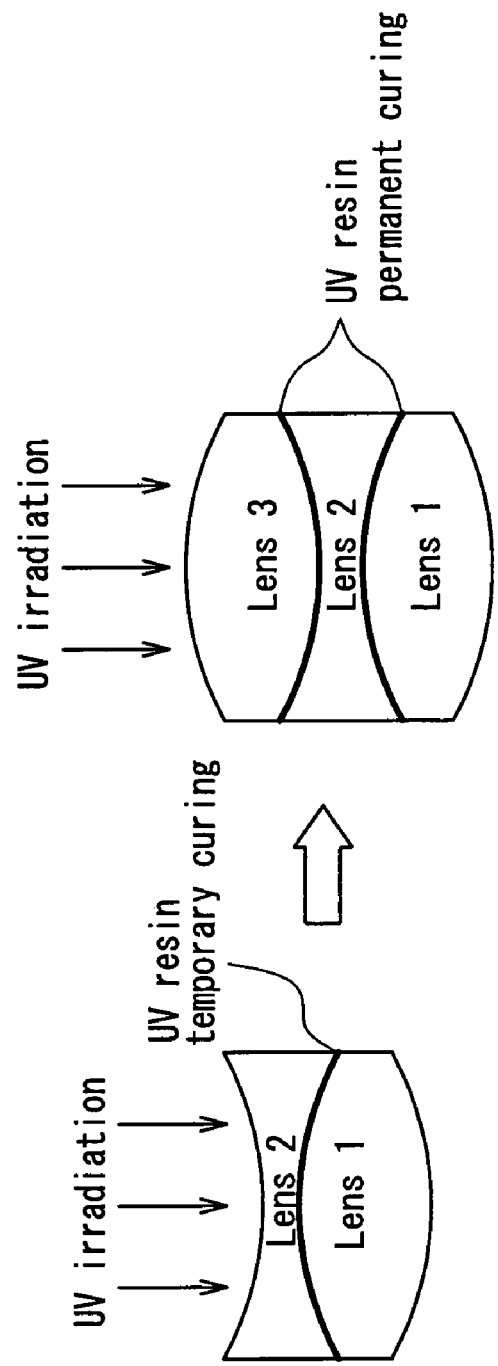
Figure 2:
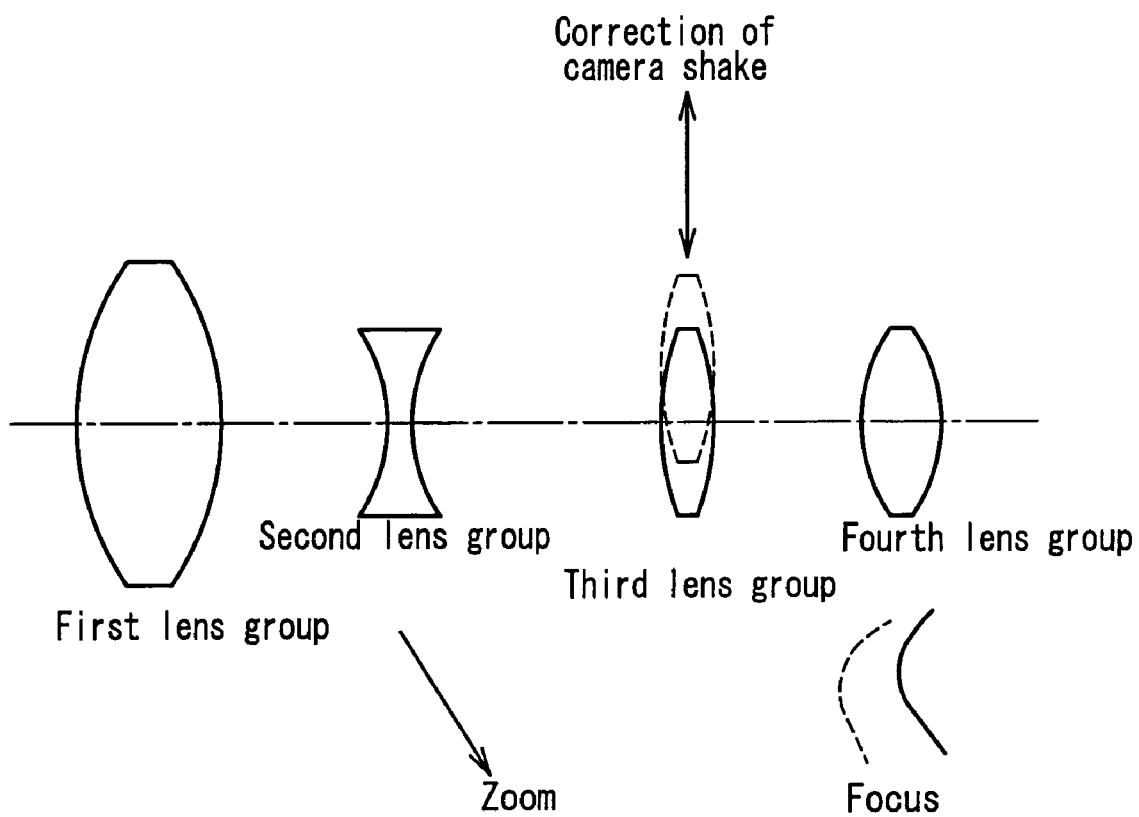
FIG. 2 is a block diagram showing a basic configuration of a zoom lens having a camera shake correction function according to the present invention.

FIG. 2 shows a basic configuration of a zoom lens provided with a camera shake correction function according to the present invention. As shown in FIG. 2, a zoom lens of the present invention consists of four lens groups composed of a first lens group, a second lens group, a third lens group and a fourth lens group, arranged in that order from an object side to an image plane side. In this case, the second lens group conducts zooming, and the fourth lens group conducts focus adjustment. Moreover, by shifting the third group in a perpendicular direction with respect to the optical axis, image fluctuations during camera shake are corrected.

First Embodiment

A zoom lens in this embodiment includes:
a first lens group that includes a lens having negative refractive power and a lens having positive refractive power, as well as a lens having positive refractive power, arranged in that order from an object side to an image plane side, the first lens group having an overall positive refractive power and being fixed with respect to an image plane;
a second lens group that is made of a concave meniscus lens, a concave lens, a double convex lens and a concave lens, arranged in that order from an object side to an image plane side, the second lens group having an overall negative refractive power, a zoom operation being carried out by shifting the second lens group on an optical axis;
an aperture stop that is fixed with respect to the image plane;
a third lens group that is made of a lens having positive refractive power, as well as a lens having a positive refractive power and a lens having negative refractive power, arranged in that order from the object side to the image plane side, the third lens group having an overall positive refractive power and being fixed with respect to the optical axis direction when zooming or focusing; and a fourth lens group that is made of a lens having positive refractive power, a lens having negative refractive power and a lens having positive refractive power, arranged in that order from the object side to the image plane side, the fourth lens group having an overall positive refractive power and being shifted on the optical axis so as to maintain the image plane that fluctuates when the second lens group is shifted on the optical axis and when the object moves, at a certain position from a reference plane.

The third lens group includes a cemented lens having a cemented surface whose convex surface faces the image plane side, and can be shifted in a direction perpendicular to the optical axis in order to correct image fluctuations during camera shake.

Furthermore, the second lens group, the third lens group or the fourth lens group includes at least one aspheric surface.

It should be noted that such an aspherical surface is defined by the following Equation 1 (this also applies to the following Second and Third Embodiments).

(Equation 1)

$$SAG = \frac{H^2/R}{1+\sqrt{1-(1+K)(H/R)^2}} + D \cdot H^4 + E \cdot H^6 + F \cdot H^8 + G \cdot H^{10}$$

In Equation 1, H denotes the height from the optical axis, SAG denotes the distance from the vertex on the aspherical surface at a height H from the optical axis, R denotes the radius of curvature at the vertex of the aspherical surface, K denotes a conic constant, and D, E, F, G denote aspheric coefficients.

It is preferable that the fourth lens group is made of a concave lens, a convex lens and a concave lens, arranged in that order from the object side to the image plane side, and that all of these lenses are cemented together.

In the zoom lens of this embodiment, all of the lenses in the fourth lens group are cemented together, and preferably, conditions of the following Expressions (1) and (2) are satisfied when $\tau_{370}$ indicates transmittance of light having a wavelength of 370 nm and $\tau_{380}$ indicates transmittance of light having a wavelength of 380 nm at a part of a lens where the thickness is 10 nm, the lens is the second in the fourth lens group when viewed from the object side.

$$0.02 < \tau_{370} < 0.2 \quad (1)$$

$$0.2 < \tau_{380} < 0.55 \quad (2)$$

In the zoom lens of this embodiment, it is preferable that the conditions of the following Expressions (3) and (4) are satisfied when RIH indicates image height, $f_1$ indicates a focal length of the first lens group, and $f_2$ indicates a focal length of the second lens group.

$$2.0 < |f_2/RIH| < 3.0 \quad (3)$$

$$0.16 < |f_2/f_1| < 0.22 \quad (4)$$

In the zoom lens of this embodiment, it is preferable that the condition of the following Expression (5) is satisfied when $f_1$ indicates a focal length of the first lens group, and $f_{11-12}$ indicates a combined focal length of a first lens and a second lens of the first lens group viewed from the object side.

$$3.2 < f_{11-12}/f_1 < 5.0 \quad (5)$$

In the zoom lens of this embodiment, it is also preferable that the condition of the following Expression (6) is satisfied when $f_{13}$ indicates a focal length of a third lens of the first lens group viewed from the object side, and $f_{132}$ indicates a focal length of a surface of the third lens of the first lens group facing the image plane when viewed from the object side.

$$-2.5 < f_{132}/f_{13} < -1.5 \quad (6)$$

In the zoom lens of this embodiment, it is also preferable that the condition of the following Expression (7) is satisfied when $dsag_{2i1}$ indicates an aspheric amount at the 10% effective aperture of an $i^{-th}$ aspheric surface of the second lens group viewed from the object side, and $dsag_{2i9}$ indicates an aspheric amount at the 90% effective aperture of an $i^{-th}$ aspheric surface of the second lens group viewed from the object side.

$$-0.23 < dsag_{2i1}/dsag_{2i9} < -0.10 \quad (7)$$

In the zoom lens of this embodiment, it is also preferable that the aspheric surface of the second lens group is arranged the closest to the image plane side, and that the concave surface faces the image plane side.

In the zoom lens of this embodiment, it is also preferable that the condition of the following Expression (8) is satisfied when $dsag_{3i1}$ indicates an aspheric amount at the 10% effective aperture of an $i^{-th}$ aspheric surface of the third lens group viewed from the object side, and $dsag_{3i9}$ indicates an aspheric amount at the 90% effective aperture of an $i^{-th}$ aspheric surface of the third lens group viewed from the object side.

$$-0.24 < dsag_{3i1}/dsag_{3i9} < -0.15 \quad (8)$$

In the zoom lens of this embodiment, it is also preferable that the condition of the following Expression (9) is satisfied when $dsag_{4i1}$ indicates an aspheric amount at the 10% effective aperture of an $i^{-th}$ aspheric surface of the fourth lens group viewed from the object side, and $dsag_{4i9}$ indicates an aspheric amount at the 90% effective aperture of an $i^{-th}$ aspheric surface of the fourth lens group viewed from the object side.

$$-0.45 < dsag_{4i1}/dsag_{4i9} < -0.13 \quad (9)$$

In the zoom lens of this embodiment, it is also preferable that the condition of the following Expression (10) is satisfied when RIH indicates an image height, $Sg_i$ indicates a specific gravity of each lens and $CL_i$ indicates a lens diameter of each lens in the third lens group.

$$\sum_{i=1}^{n} (Sg_i \cdot CL_i^2)/RIH < 50 \quad (10)$$

The following is a more detailed explanation of a zoom lens according to this embodiment, illustrated by specific examples.

EXAMPLE 1

Table 1 below shows a specific numerical example of a zoom lens according to this example.

TABLE 1

| Group | Surface | r | d | n | ν | Sg | CL |
|---|---|---|---|---|---|---|---|
| 1 | 1 | 52.574 | 1.30 | 1.84666 | 23.9 | | |
| | 2 | 29.062 | 6.00 | 1.48749 | 70.4 | | |
| | 3 | −428.263 | 0.15 | | | | |
| | 4 | 28.204 | 3.80 | 1.77250 | 49.6 | | |
| | 5 | 93.817 | variable | | | | |
| 2 | 6 | 93.817 | 0.70 | 1.80610 | 33.3 | | |
| | 7 | 6.295 | 3.55 | | | | |
| | 8 | −20.692 | 0.70 | 1.69680 | 55.6 | | |
| | 9 | 100.000 | 0.20 | | | | |
| | 10 | 27.934 | 2.50 | 1.84666 | 23.9 | | |
| | 11 | −13.282 | 1.00 | 1.66547 | 55.2 | | |
| | 12 | 79.253 | variable | | | | |
| ap.stop | 13 | — | 1.65 | | | | |
| 3 | 14 | 9.655 | 2.50 | 1.60602 | 57.5 | 3.09 | 3.75 |
| | 15 | −19.001 | 2.35 | | | | |
| | 16 | 19.879 | 1.30 | 1.48749 | 70.4 | 2.45 | 3.60 |
| | 17 | −700.000 | 0.70 | 1.84666 | 23.9 | 3.49 | 3.40 |
| | 18 | 8.208 | variable | | | | |
| 4 | 19 | 11.189 | 1.70 | 1.69680 | 55.6 | | |
| | 20 | 700.000 | 1.00 | 1.80518 | 25.4 | | |
| | 21 | 36.974 | 1.80 | 1.60602 | 57.5 | | |
| | 22 | −38.063 | variable | | | | |
| 5 | 23 | ∞ | 2.70 | 1.51633 | 64.1 | | |
| | 24 | ∞ | — | | | | |

In Table 1, r (mm) denotes the radius of curvature of the lens surfaces, d (mm) denotes the lens thickness or the air distance between lenses, n denotes the refractive index of the lenses at the d-line, and ν denotes the Abbe number of the lenses at the d-line (this also applies to Examples 2 to 4 below).

Table 2 below lists the aspheric coefficients for the zoom lens of this example.

TABLE 2

| Surface | 12 | 14 | 15 | 22 |
|---|---|---|---|---|
| K | 0.00000E+00 | −3.45053E−01 | −2.50386E+00 | −1.83155E+02 |
| D | −1.23365E−04 | −2.55575E−04 | −8.71189E−05 | −2.16340E−04 |
| E | −1.24521E−06 | 2.29320E−06 | 5.71117E−07 | 1.48111E−05 |
| F | 3.06330E−08 | −6.14819E−07 | −4.72710E−07 | −3.17582E−07 |
| G | −1.68776E−09 | 4.25557E−09 | 0.00000E+00 | 0.00000E+00 |

Table 3 below lists the air distances (mm) that can be varied by zooming in the case where the object point is located at infinity when measured from a lens tip. The standard position in Table 3 below is the position at which the zoom factor of the second lens group becomes x−1. In Table 3 below, f (mm), F/No, and ω (°) respectively denote the focus distance, the F number, the incident half field angle at the wide-angle end, the standard position and the tele end of the zoom lens in Table 1 (this also applies to Examples 2 to 4 below).

TABLE 3

| | wide-angle end | standard | tele end |
|---|---|---|---|
| f | 4.658 | 23.539 | 55.300 |
| F/NO | 2.840 | 2.826 | 2.832 |
| 2ω | 64.718 | 13.474 | 5.726 |
| d5 | 0.700 | 20.736 | 26.500 |
| d10 | 26.500 | 7.464 | 1.700 |
| d14 | 7.500 | 4.155 | 7.440 |
| d19 | 2.000 | 5.345 | 2.060 |

Figure 3:
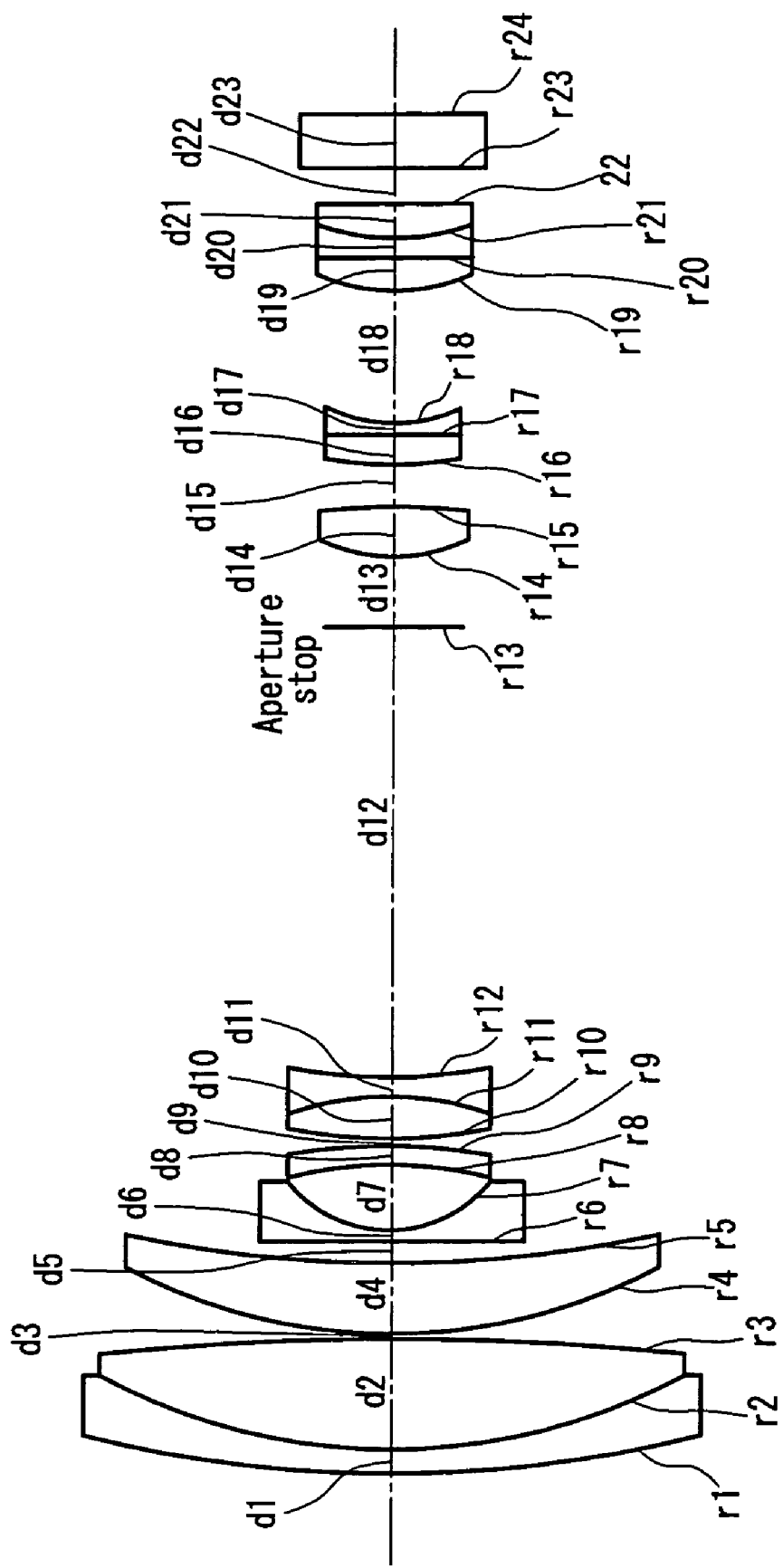
FIG. 3 is a layout illustrating the configuration of a zoom lens according to Example 1 of the present invention.

FIG. 3 shows a zoom lens configured on the basis of data shown in the above Table 1. In FIG. 3, a group of lenses indicated as r1–r5 compose a first lens group, a group of lenses indicated as r6–r12 compose a second lens group, a group of lenses indicated as r14–r18 compose a third lens group, and a group of lenses indicated as r19–r22 compose a fourth lens group. Also in FIG. 3, optical components indicated as r23 and r24 are flat plates equivalent to an optical low-pass filter and a face plate of CCD.

FIGS. 4 to 6 are aberration graphs for the wide-angle end, the standard position and the tele end of the zoom lens in this example. In these figures, A is the graph for the spherical aberration, and shows the value at the d-line. B is the graph for the astigmatism; the solid curve indicates the sagittal image plane curvature, and the broken curve indicates the meridional image plane curvature. C is the graph for the distortion. D is the graph for the longitudinal chromatic aberration; the solid curve indicates the value for the d-line, the short broken curve indicates the value for the F-line, and the long broken curve indicates the value for the C-line. E is the graph for the lateral chromatic aberration; the short broken curve indicates the value for the F-line, and the long broken curve indicates the value for the C-line (these also apply to Examples 2 to 4 below).

As becomes clear from the aberration graphs in FIGS. 4 to 6, the zoom lens of this example has sufficient aberration correcting capability for achieving a high resolution.

FIGS. 7A–7C show the aberration graphs during a camera shake correction of 0.31° at the tele end. FIG. 7A is a graph of the lateral aberration at a relative image height of 0.75, FIG. 7B is a graph of the lateral aberration at image plane center, and FIG. 7C is a graph of the lateral aberration at a relative image height of −0.75; the solid curve indicates the value for the d-line, the short broken curve indicates the value for the F-line, the long broken curve indicates the value for the C-line, and the dash-dotted curve indicates the value for the g-line (these also apply to Examples 2 to 4 below).

As becomes clear from the aberration graphs shown in FIGS. 7A–7C, the zoom lens of this example has favorable aberration properties even while correcting camera shake.

The following are the values for the conditional expressions for the zoom lens of this example.

$\tau_{370} = 0.14$ $\tau_{380} = 0.48$ $|f_2/RIH| = 2.912$ $|f_2/f_1| = 0.197$ $f_{11\text{-}12}/f_1 = 4.84$ $f_{132}/f_{13} = -2.385$ $dsag_{211}/dsag_{219} = -0.186$ $dsag_{311}/dsag_{319} = -0.176$ $dsag_{321}/dsag_{329} = -0.218$ $dsag_{411}/dsag_{419} = -0.181$ $$\sum_{i=1}^{n}(Sg_i \cdot CL_i^2)/RIH = 41.3$$

EXAMPLE 2

Table 4 below shows a specific numerical example of a zoom lens according to this example.

TABLE 4

| Group | Surface | r | d | n | ν | Sg | CL |
|---|---|---|---|---|---|---|---|
| 1 | 1 | 54.725 | 1.30 | 1.84666 | 23.9 | | |
| | 2 | 29.679 | 6.00 | 1.48749 | 70.4 | | |
| | 3 | −307.125 | 0.15 | | | | |
| | 4 | 28.212 | 3.80 | 1.77250 | 49.6 | | |
| | 5 | 92.607 | variable | | | | |
| 2 | 6 | 92.067 | 0.70 | 1.80610 | 33.3 | | |
| | 7 | 6.314 | 3.55 | | | | |
| | 8 | −17.642 | 0.70 | 1.69680 | 55.6 | | |
| | 9 | −70.000 | 0.20 | | | | |
| | 10 | 30.350 | 2.50 | 1.84666 | 23.9 | | |
| | 11 | −13.036 | 1.00 | 1.66547 | 55.2 | | |
| | 12 | 40.000 | variable | | | | |
| ap.stop | 13 | — | 1.65 | | | | |
| 3 | 14 | 9.504 | 2.50 | 1.60602 | 57.5 | 3.09 | 3.70 |
| | 15 | −17.913 | 2.35 | | | | |
| | 16 | 26.391 | 1.30 | 1.48749 | 70.4 | 2.45 | 3.40 |
| | 17 | −700.000 | 0.70 | 1.84666 | 23.9 | 3.49 | 3.20 |
| | 18 | 8.314 | variable | | | | |
| 4 | 19 | 10.867 | 1.70 | 1.69680 | 55.6 | | |
| | 20 | 700.000 | 1.00 | 1.84666 | 23.9 | | |
| | 21 | 32.370 | 1.80 | 1.60602 | 57.5 | | |
| | 22 | −34.831 | variable | | | | |
| 5 | 23 | ∞ | 2.70 | 1.51633 | 64.1 | | |
| | 24 | ∞ | — | | | | |

TABLE 5

| Surface | 12 | 14 | 15 | 22 |
|---|---|---|---|---|
| K | 0.00000E+00 | −3.92587E−01 | −2.56247E+00 | −1.34562E+02 |
| D | −1.34759E−04 | −2.59655E−04 | −8.58969E−05 | −1.82759E−04 |
| E | −1.15418E−06 | 2.00442E−06 | 9.52159E−08 | 1.30906E−05 |
| F | 1.95786E−08 | −6.71309E−07 | −5.51053E−07 | −2.63083E−07 |
| G | −1.44027E−09 | 2.57405E−09 | 0.00000E+00 | 0.00000E+00 |

Table 6 below lists the air distances (mm) that can be varied by zooming when the object point is located at infinity as measured from a lens tip.

TABLE 6

| | wide-angle end | standard | tele end |
|---|---|---|---|
| f | 4.687 | 23.835 | 55.776 |
| F/NO | 2.843 | 2.834 | 2.838 |
| 2ω | 64.304 | 13.286 | 5.668 |
| d5 | 0.700 | 20.745 | 26.500 |
| d10 | 26.500 | 7.455 | 1.700 |
| d14 | 7.500 | 4.126 | 7.469 |
| d19 | 2.000 | 5.374 | 2.301 |

Figures 8A, 8B, 8C, 8D, 8E:
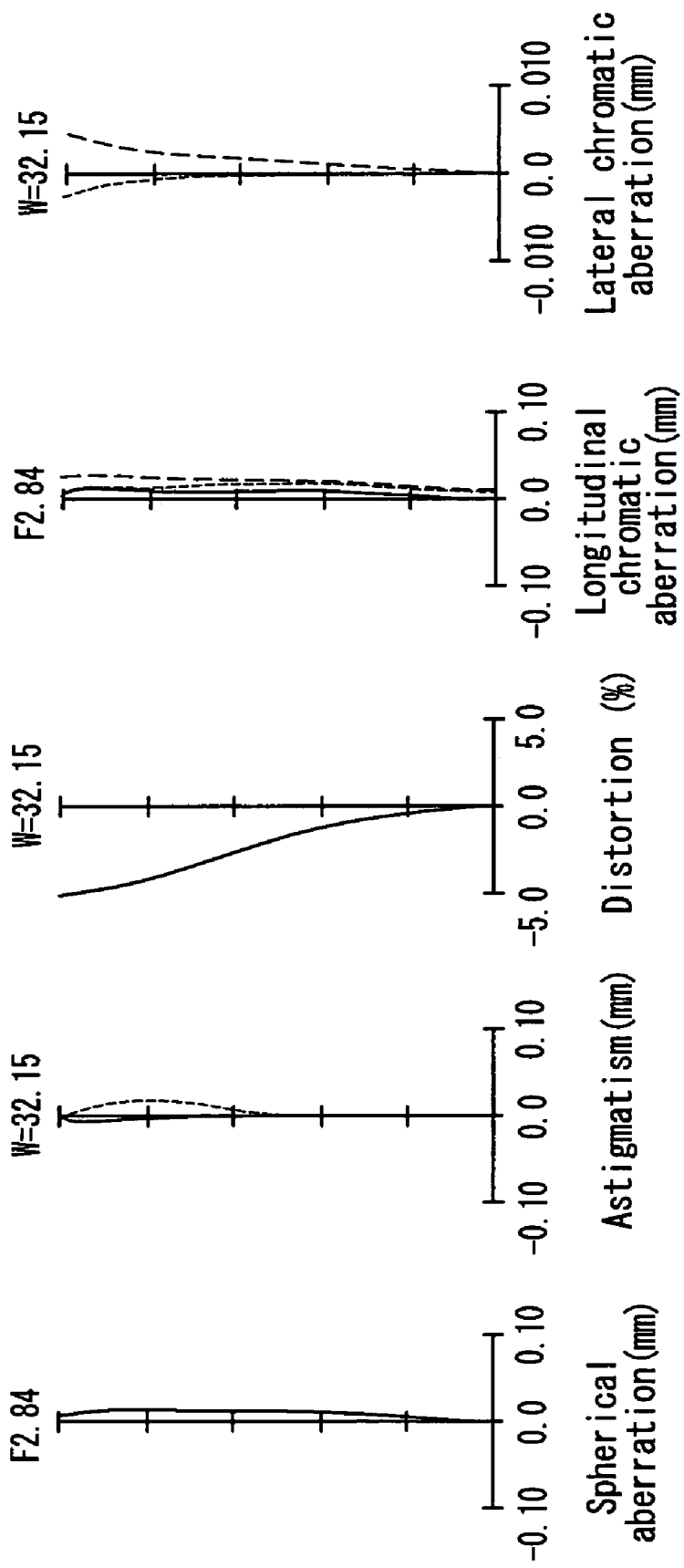
FIGS. 8A–8E show aberration graphs for the wide-angle end of the zoom lens in Example 2 of the present invention.

FIGS. 8 to 10 are aberration graphs for the wide-angle end, the standard position and the tele end of the zoom lens in this example.

As becomes clear from the aberration graphs in FIGS. 8 to 10, the zoom lens of this example has sufficient aberration correcting capability for achieving a high resolution.

Figure 11A:
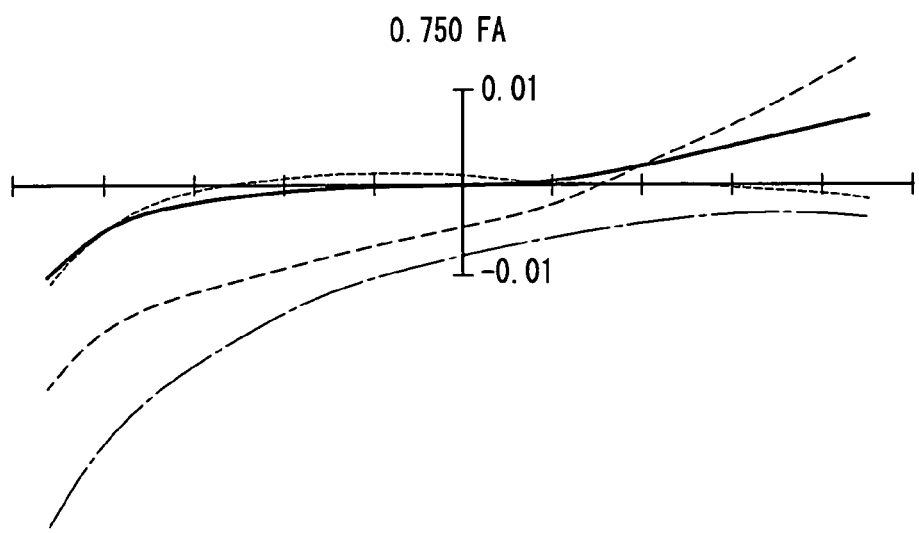
FIGS. 11A–11C show the aberration graphs during a camera shake correction at the tele end in Example 2 of the present invention.
Figure 11B:
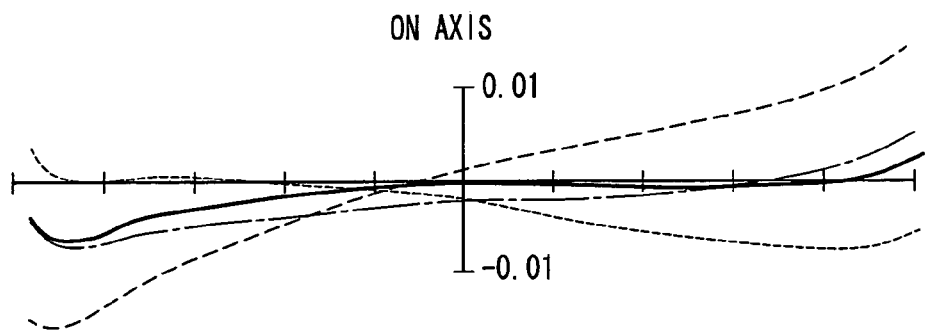
Figure 11C:
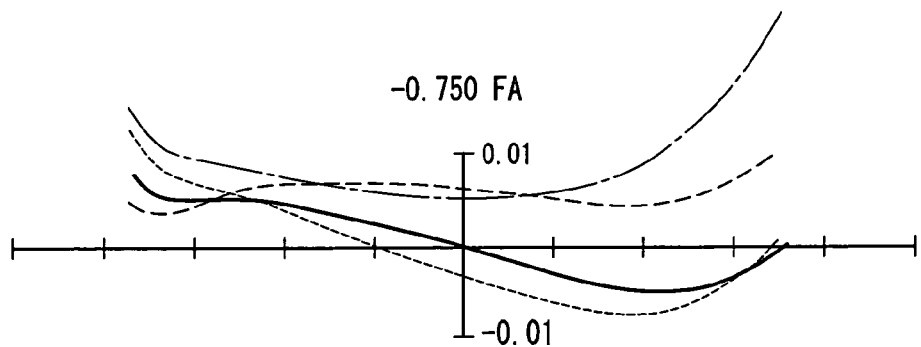

FIGS. 11A–11C show the aberration graphs during a camera shake correction of 0.30° at the tele end.

As becomes clear from the aberration graphs shown in FIGS. 11A–11C, the zoom lens of this example has favorable aberration properties even while correcting camera shake.

The following are the values for the conditional expressions for the zoom lens of this example.

$\tau_{370}=0.03$ $\tau_{380}=0.27$ $|f_2/RIH|=2.908$ $|f_2/f_1|=0.197$ $f_{11\text{-}12}/f_1=4.786$ $f_{132}/f_{13}=-2.341$ $dsag_{211}/dsag_{219}=-0.193$ $dsag_{311}/dsag_{319}=-0.218$ $dsag_{321}/dsag_{329}=-0.178$ $dsag_{411}/dsag_{419}=-0.177$ $$\sum_{i=1}^{n}(Sg_i \cdot CL_i^2)/RIH = 38.0$$

Second Embodiment

A zoom lens in this embodiment includes:

a first lens group that includes a lens having negative refractive power and a lens having positive refractive power, as well as a lens having positive refractive power, arranged in that order from an object side to an image plane side, the first lens group having an overall positive refractive power and being fixed with respect to an image plane;

a second lens group having an overall negative refractive power, a zoom operation being carried out by shifting the second lens group on an optical axis;

an aperture stop that is fixed with respect to the image plane;

a third lens group that is made of three single lenses consisting of a convex lens, a concave lens and a convex lens, arranged in that order from the object side to the image plane side, the third lens group having an overall positive refractive power and being fixed with respect to the optical axis direction when zooming or focusing; and a fourth lens group that is made of three single lenses consisting of a lens having positive refractive power, a lens having negative refractive power and a lens having positive refractive power, arranged in that order from the object side to the image plane side, the fourth lens group having an overall positive refractive power and being shifted on the optical axis so as to maintain the image plane that fluctuates when the second lens group is shifted on the optical axis and when the object moves, at a certain position from a reference plane.

The third lens group can be shifted in a direction perpendicular to the optical axis in order to correct image fluctuations during camera shake.

Furthermore, the second lens group, the third lens group or the fourth lens group includes at least one aspheric surface.

Also in the zoom lens of this embodiment, it is preferable that the conditions of Expressions (3)–(10) are satisfied.

It is also preferable for the zoom lens of this embodiment that the aspheric surface of the second lens group is arranged the closest to the image plane side, and that the concave surface faces the image plane side.

The following is a more detailed explanation of a zoom lens according to this embodiment, illustrated by specific examples.

EXAMPLE 3

Table 7 below shows a specific numerical example of a zoom lens according to this example.

TABLE 7

| Group | Surface | r | d | n | ν | Sg | CL |
|---|---|---|---|---|---|---|---|
| 1 | 1 | 57.825 | 1.30 | 1.84666 | 23.9 | | |
|  | 2 | 30.271 | 5.45 | 1.48749 | 70.4 | | |
|  | 3 | −215.251 | 0.15 | | | | |
|  | 4 | 26.919 | 3.80 | 1.77250 | 49.6 | | |
|  | 5 | 77.730 | variable | | | | |
| 2 | 6 | 82.307 | 0.70 | 1.80610 | 33.3 | | |
|  | 7 | 6.223 | 3.55 | | | | |
|  | 8 | −28.392 | 0.70 | 1.69680 | 55.6 | | |
|  | 9 | 64.541 | 0.24 | | | | |
|  | 10 | 22.584 | 2.09 | 1.84666 | 23.9 | | |
|  | 11 | −16.043 | 1.00 | 1.66547 | 55.2 | | |
|  | 12 | 40.111 | variable | | | | |
| ap.stop | 13 | — | 1.60 | | | | |
| 3 | 14 | 8.141 | 1.72 | 1.60602 | 57.5 | 3.09 | 3.90 |
|  | 15 | −72.295 | 2.32 | | | | |
|  | 16 | 30.187 | 0.70 | 1.71736 | 29.5 | 3.08 | 3.60 |
|  | 17 | 6.982 | 0.60 | | | | |
|  | 18 | 13.467 | 1.58 | 1.51823 | 59.0 | 2.53 | 3.50 |
|  | 19 | 80.263 | variable | | | | |
| 4 | 20 | 9.087 | 1.70 | 1.83400 | 37.3 | | |
|  | 21 | 2324.588 | 0.20 | | | | |
|  | 22 | −308.441 | 0.70 | 1.84666 | 23.9 | | |
|  | 23 | 8.254 | 0.45 | | | | |
|  | 24 | 10.330 | 1.82 | 1.60602 | 57.5 | | |
|  | 25 | −122.862 | variable | | | | |
| 5 | 26 | ∞ | 3.30 | 1.51633 | 64.1 | | |
|  | 27 | ∞ | — | | | | |

Table 8 below lists the aspheric coefficients for the zoom lens of this example.

TABLE 8

| Surface | 12 | 14 | 25 |
|---|---|---|---|
| K | −2.40539E+01 | −3.39446E−02 | 2.94679E−01 |
| D | −9.44918E−05 | −1.83964E−04 | −1.44338E−04 |
| E | −1.74618E−06 | 7.45147E−07 | 1.40336E−06 |
| F | −2.30285E−08 | −1.53778E−07 | −1.25465E−07 |
| G | −5.50990E−10 | 3.37757E−09 | 3.72879E−09 |

Table 9 below lists the air distances (mm) that can be varied by zooming when the object point is located at infinity as measured from a lens tip.

TABLE 9

| | wide-angle end | standard | tele end |
|---|---|---|---|
| f | 4.690 | 24.135 | 55.731 |
| F/NO | 2.840 | 2.863 | 2.829 |
| 2ω | 64.346 | 13.242 | 5.722 |
| d5 | 0.700 | 20.733 | 26.500 |
| d10 | 27.500 | 7.467 | 1.700 |
| d14 | 7.500 | 3.846 | 7.441 |
| d19 | 2.000 | 5.654 | 2.059 |

Figure 12:
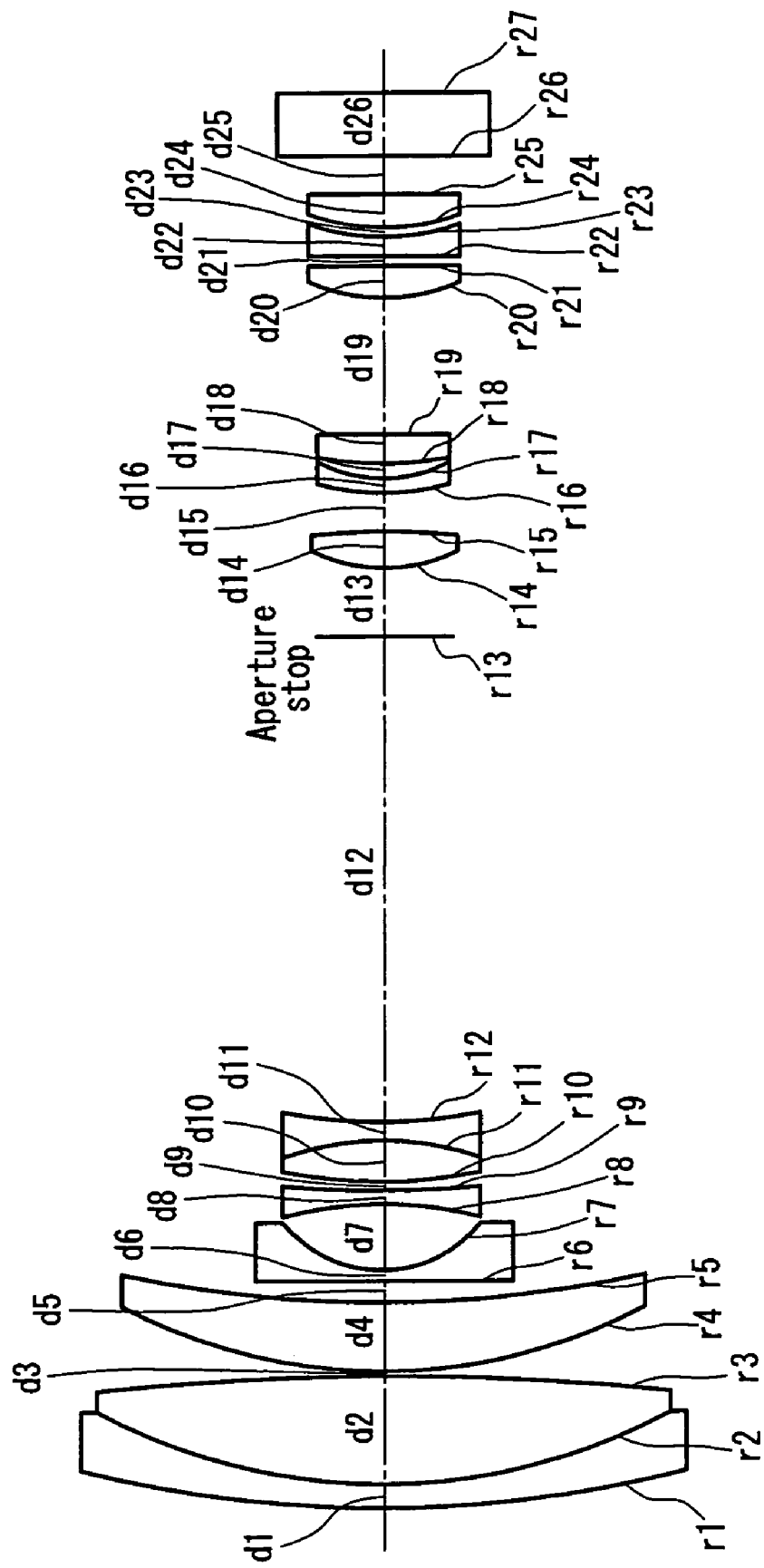
FIG. 12 is a layout illustrating the configuration of a zoom lens according to Example 3 of the present invention.

FIG. 12 shows a zoom lens configured on the basis of data of the above Table 7. In FIG. 12, a group of lenses indicated as r1–r5 compose a first lens group, a group of lenses indicated as r6–r12 compose a second lens group, a group of lenses indicated as r14–r19 compose a third lens group, and a group of lenses indicated as r20–r25 compose a fourth lens group. In FIG. 12, optical components indicated as r26 and r27 are flat plates equivalent to an optical low-pass filter and a face plate of CCD.

FIGS. 13 to 15 are aberration graphs for the wide-angle end, the standard position and the tele end of the zoom lens in this example.

As becomes clear from the aberration graphs in FIGS. 13 to 15, the zoom lens of this example has sufficient aberration correcting capability for achieving a very high resolution.

Figure 16A:
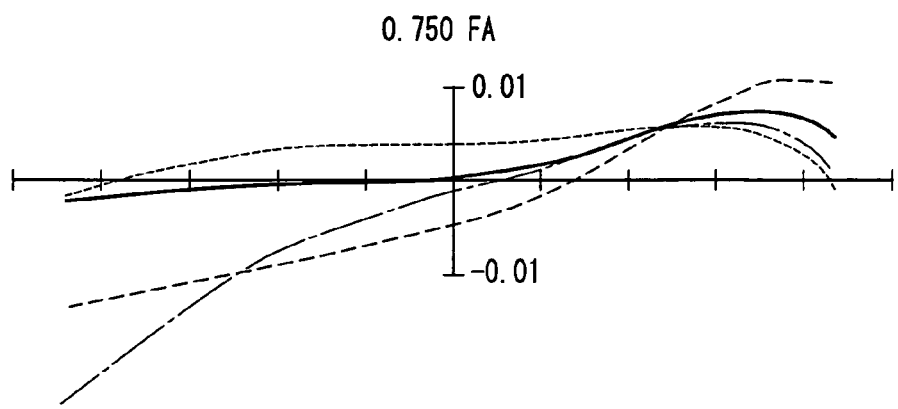
FIGS. 16A–16C show the aberration graphs during a camera shake correction at the tele end in Example 3 of the present invention.
Figure 16B:
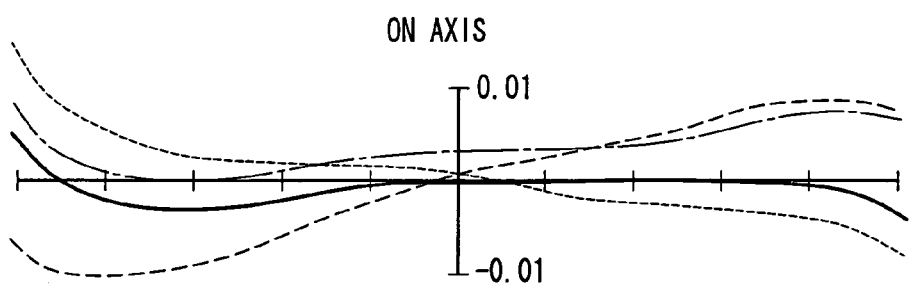
Figure 16C:
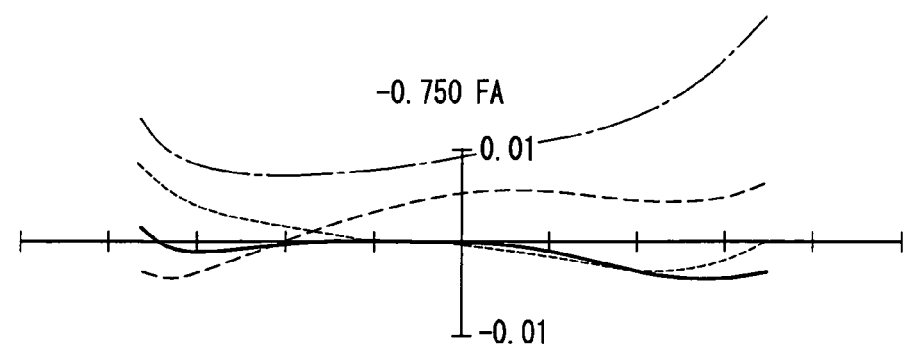

FIGS. 16A–16C show the aberration graphs during a camera shake correction of 0.33° at the tele end.

As becomes clear from the aberration graphs shown in FIGS. 16A–16C, the zoom lens of this example has favorable aberration properties even while correcting camera shake.

The following are the values for the conditional expressions for the zoom lens of this example.

$|f_2/RIH|=2.911$ $|f_2/f_1|=0.197$ $f_{11-12}/f_1=4.725$ $f_{132}/f_{13}=-1.949$ $dsag_{211}/dsag_{219}=-0.159$ $dsag_{311}/dsag_{319}=-0.210$ $dsag_{411}/dsag_{419}=-0.185$ $$\sum_{i=1}^{n}(Sg_i \cdot CL_i^2)/RIH = 42.2$$

Third Embodiment

A zoom lens in this embodiment includes:

a first lens group that includes a lens having negative refractive power and a lens having positive refractive power, as well as a lens having positive refractive power, arranged in that order from an object side to an image plane side, the first lens group having an overall positive refractive power and being fixed with respect to an image plane;

a second lens group that is made of a concave meniscus lens, a double concave lens, a double convex lens and a convex lens, arranged in that order from an object side to an image plane side, having an overall negative refractive power, a zoom operation being carried out by shifting the second lens group on an optical axis;

an aperture stop that is fixed with respect to the image plane;

a third lens group that is made of a double convex lens and a cemented lens consisting of a convex lens and a concave lens, arranged in that order from an object side to an image plane side, the third lens group having an overall positive refractive power and being fixed with respect to the optical axis direction when zooming or focusing; and a fourth lens group that is made of a single (convex) lens, being shifted on the optical axis so as to maintain the image plane that fluctuates when the second lens group is shifted on the optical axis and when the object moves, at a certain position from a reference plane.

The third lens group can be shifted in a direction perpendicular to the optical axis in order to correct image fluctuations during camera shake.

Furthermore, the second lens group, the third lens group or the fourth lens group includes at least one aspheric surface.

Also in the zoom lens of this embodiment, it is preferable that the conditions of Expressions (3)–(10) are satisfied.

Also in the zoom lens of this embodiment, it is preferable that the aspheric surface of the second lens group is arranged the closest to the image plane side, and that the concave surface faces the image plane side.

The following is a more detailed explanation of a zoom lens according to this embodiment, illustrated by specific examples.

EXAMPLE 4

Table 10 below shows a specific numerical example of a zoom lens according to this example.

TABLE 10

| Group | Surface | r | d | n | ν | Sg | CL |
|---|---|---|---|---|---|---|---|
| | 1 | 64.855 | 1.30 | 1.84666 | 23.9 | | |
| | 2 | 27.412 | 6.55 | 1.60311 | 60.7 | | |
| | 3 | −149.171 | 0.15 | | | | |
| | 4 | 22.681 | 3.95 | 1.77250 | 49.6 | | |
| | 5 | 57.358 | variable | | | | |
| 2 | 6 | 57.358 | 0.70 | 1.83400 | 37.2 | | |
| | 7 | 6.027 | 2.75 | | | | |
| | 8 | −11.431 | 1.00 | 1.66547 | 55.2 | | |
| | 9 | 24.993 | 0.55 | | | | |
| | 10 | 15.528 | 2.20 | 1.80518 | 25.4 | | |
| | 11 | −15.528 | 0.70 | 1.69680 | 55.6 | | |
| | 12 | 97.011 | variable | | | | |
| ap.stop | 13 | — | 2.10 | | | | |
| 3 | 14 | 10.701 | 2.70 | 1.51450 | 63.1 | 2.39 | 3.90 |
| | 15 | −15.856 | 3.40 | | | | |
| | 16 | 8.530 | 2.30 | 1.48749 | 70.4 | 2.45 | 3.60 |
| | 17 | −700.000 | 0.70 | 1.84666 | 23.9 | 3.49 | 3.50 |
| | 18 | 7.086 | variable | | | | |
| 4 | 19 | 9.433 | 2.50 | 1.60602 | 57.4 | | |
| | 20 | −51.188 | variable | | | | |
| 5 | 21 | ∞ | 2.70 | 1.51633 | 64.1 | | |
| | 22 | ∞ | — | | | | |

Table 11 below lists the aspheric coefficients for the zoom lens of this example.

TABLE 11

| Surface | 8 | 14 | 15 | 19 | 20 |
|---|---|---|---|---|---|
| K | 2.90787E−01 | −1.39931E+00 | −9.66288E−01 | −5.30841E−01 | −4.53023E+01 |
| D | 7.42659E−05 | −1.76234E−04 | −1.07190E−04 | 2.18369E−05 | 5.43407E−05 |
| E | −9.45583E−06 | 5.34872E−07 | −1.16524E−06 | 4.25755E−06 | 4.79802E−06 |
| F | 4.14403E−07 | −5.48708E−07 | −4.24862E−07 | −1.82715E−07 | −2.64861E−07 |
| G | −1.09933E−08 | 8.94570E−09 | 4.56042E−09 | 1.22783E−09 | 1.26562E−09 |

Table 12 below lists the air distances (mm) that can be varied by zooming when the object point is located at infinity as measured from a lens tip.

TABLE 12

| | wide-angle end | standard | tele end |
|---|---|---|---|
| f | 4.674 | 22.932 | 56.934 |
| F/NO | 2.816 | 2.711 | 2.818 |
| 2ω | 65.030 | 13.890 | 5.534 |
| d5 | 1.000 | 16.547 | 21.060 |
| d10 | 21.500 | 5.953 | 1.440 |
| d14 | 7.200 | 3.314 | 7.298 |
| d19 | 1.000 | 4.869 | 0.902 |

Figure 17:
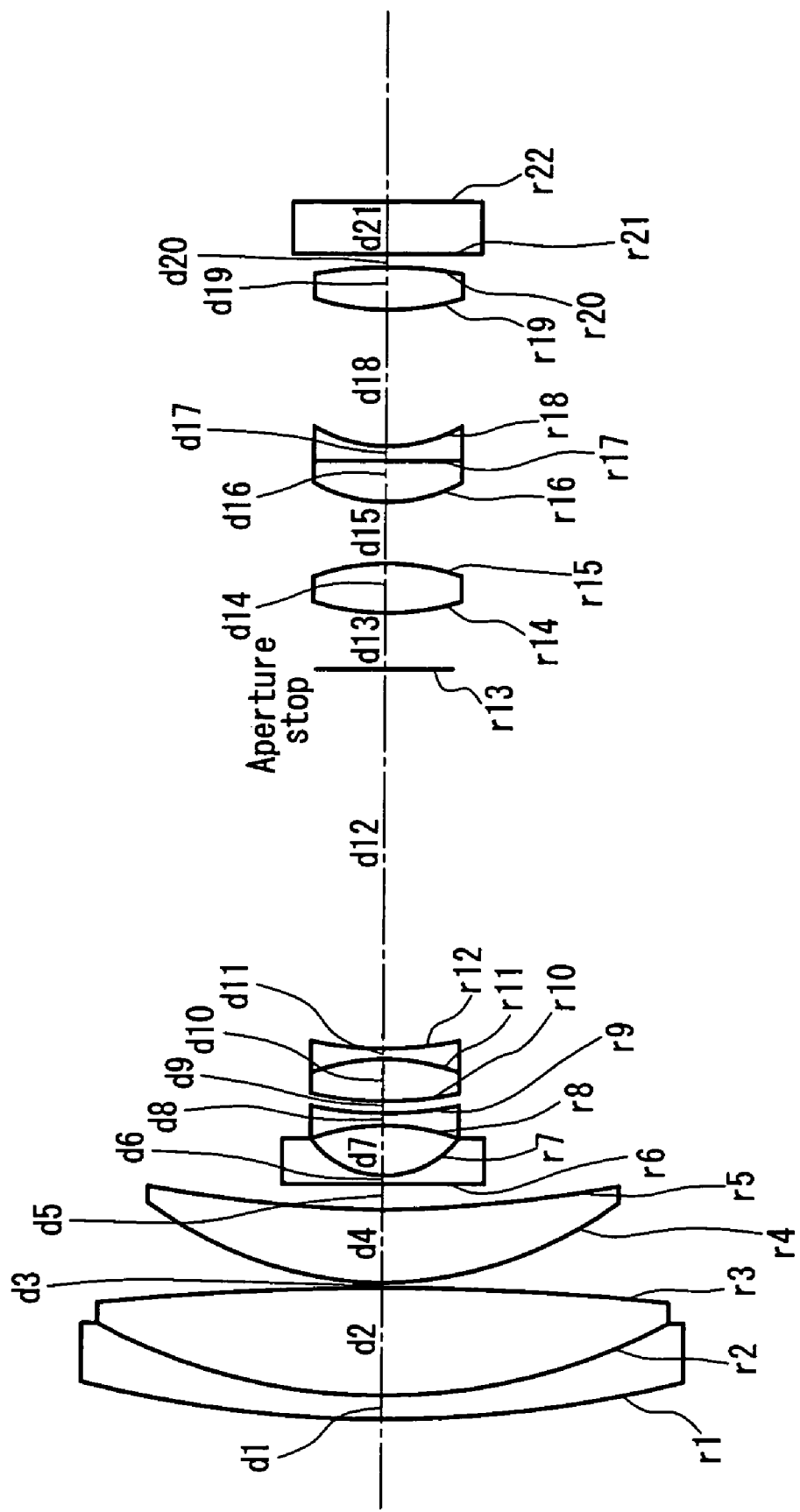
FIG. 17 is a layout illustrating the configuration of a zoom lens according to Example 4 of the present invention.

FIG. 17 shows a zoom lens configured on the basis of data of the above Table 10. In FIG. 17, a group of lenses indicated as r1–r5 compose a first lens group, a group of lenses indicated as r6–r12 compose a second lens group, a group of lenses indicated as r14–r18 compose a third lens group, and a group of lenses indicated as r19–r20 compose a fourth lens group. In FIG. 17, optical components indicated as r21 and r22 are flat plates equivalent to an optical low pass filter and a face plate of CCD.

FIGS. 18 to 20 are aberration graphs for the wide-angle end, the standard position and the tele end of the zoom lens in this example.

As becomes clear from the aberration graphs in FIGS. 18 to 20, the zoom lens of this example has sufficient aberration correcting capability for achieving a very high resolution.

FIGS. 21A–21C show the aberration graphs during a camera shake correction of 0.31° at the tele end.

As becomes clear from the aberration graphs shown in FIGS. 2A–21C, the zoom lens of this example has favorable aberration properties even while correcting camera shake.

The following are the values for the conditional expressions for the zoom lens of this example.

$|f_2/RIH|=2.261$ $|f_2/f_1|=0.186$ $f_{11\text{-}12}/f_1=3.597$ $f_{132}/f_{13}=-1.605$ $dsag_{211}/dsag_{219}=-0.131$ $dsag_{311}/dsag_{319}=-0.196$ $dsag_{321}/dsag_{329}=-0.219$ $dsag_{411}/dsag_{419}=-0.418$ $dsag_{421}/dsag_{429}=-0.152$ $$\sum_{i=1}^{n}(Sg_i \cdot CL_i^2)/RIH = 42.4$$

Fourth Embodiment

Figure 22:
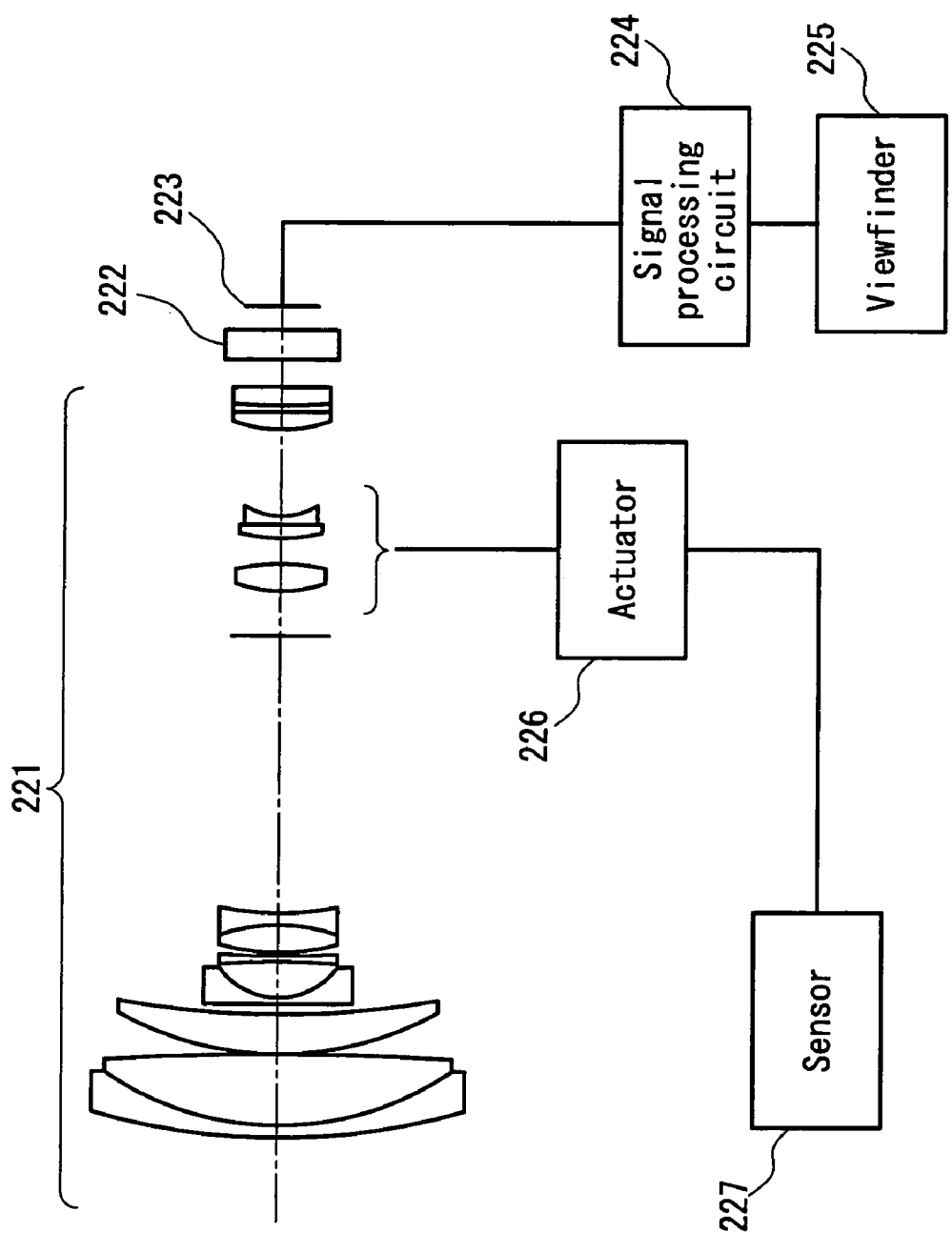
FIG. 22 is a layout illustrating a configuration of a video camera according to a fourth embodiment of the present invention.

FIG. 22 is a layout illustrating a configuration of a video camera according to a fourth embodiment of the present invention.

As shown in FIG. 22, the video camera according to this embodiment includes a zoom lens 221, a low-pass filter 222 and an imaging element 223 arranged in this order on the image plane side of the zoom lens 221. A viewfinder 225 is connected to the imaging element 223 via a signal processing circuit 224. Here, for the zoom lens 221, the zoom lens (see FIG. 3) of Example 1 having a camera shake correction function is used, and thus a video camera, which is small, light-weight and able to save power, can be realized. Moreover, to the third lens group of the zoom lens 221, a sensor 227 for detecting camera shake is connected via an actuator for shifting the third lens group in a perpendicular direction with respect to the optical axis.

It should be noted that in this embodiment, the zoom lens of the Example 1 as shown in FIG. 3 is used, but it is also possible to use any of the zoom lenses, for example, of Examples 2–4 instead.

Fifth Embodiment

Figure 23:
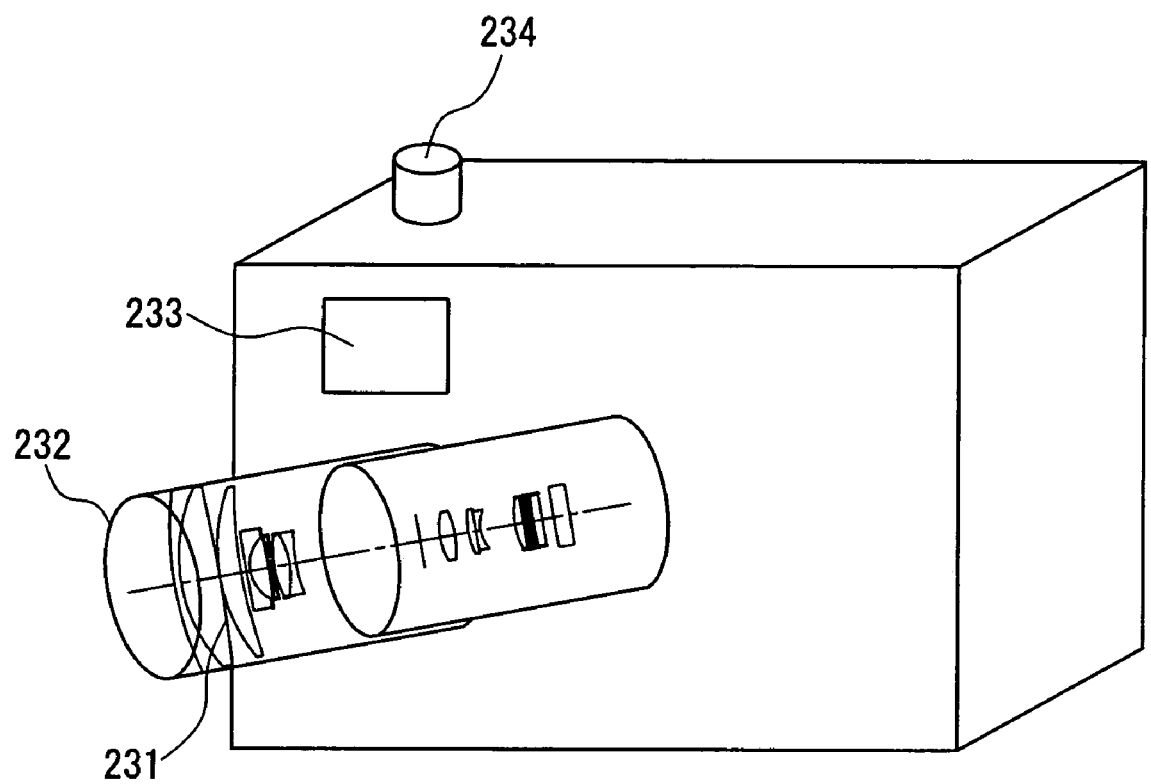
FIG. 23 is a perspective view showing a configuration of a digital still camera according to a fifth embodiment of the present invention.

FIG. 23 illustrates a configuration of a digital still camera according to a fifth embodiment of the present invention.

In FIG. 23, 231 denotes a zoom lens (FIG. 3) of Example 1 having a camera shake correction function. Furthermore, 232 denotes a collapsible lens barrel 233 denotes an optical viewfinder, and 234 denotes a shutter respectively.

It should be noted that in this embodiment, the zoom lens of Example 1 as shown in FIG. 3 is used, but it is also possible to use any of the zoom lenses, for example, of Examples 2–4 instead.

What is claimed is:

1. A zoom lens comprising:
   a first lens group that is made of a lens having negative refractive power and a lens having positive refractive power, as well as a lens having positive refractive power, arranged in that order from an object side to an image plane side, the first lens group having an overall positive refractive power and being fixed with respect to an image plane;
   a second lens group having an overall negative refractive power, a zoom operation being carried out by shifting the second lens group on an optical axis;
   an aperture stop that is fixed with respect to the image plane;
   a third lens group that is made of a lens having positive refractive power, as well as a lens having a positive refractive power and a lens having negative refractive power, arranged in that order from the object side to the image plane side, the third lens group having an overall positive refractive power and being fixed with respect to the optical axis direction when zooming or focusing; and
   a fourth lens group that is made of a lens having positive refractive power, a lens having negative refractive power and a lens having positive refractive power, arranged in that order from the object side to the image plane side, the fourth lens group having an overall positive refractive power and being shifted on the optical axis so as to maintain the image plane that fluctuates when the second lens group is shifted on the optical axis and when the object moves, at a certain position from a reference plane;
   wherein the second lens group is made of a concave meniscus lens, a concave lens, a double convex lens and a concave lens, arranged in that order from the object side to the image plane side, and includes at least one aspheric surface;
   wherein the third lens group comprises a cemented lens having a cemented surface whose convex surface faces the image plane side, the third lens group can be shifted in a direction perpendicular to the optical axis in order to correct image fluctuations during camera shake, and includes at least one aspheric surface;
   wherein the fourth lens group comprises at least one aspheric surface; and
   wherein a condition of the following Expression (5) is satisfied when $f_1$ indicates a focal length of the first lens group, and $f_{11\text{-}12}$ indicates a combined focal length of a first lens and a second lens of the first lens group viewed from the object side $$3.2 < f_{11\text{-}12}/f_1 < 5.0 \tag{5}$$

2. The zoom lens according to claim 1, wherein the fourth lens group is made of a convex lens, a concave lens and a convex lens, arranged in that order from the object side to the image plane side, and all of the lenses are cemented together.

3. The zoom lens according to claim 1, wherein the fourth lens group is made of three lenses and all of the lenses are cemented together, satisfying conditions of the following Expressions (1) and (2) when $\tau_{370}$ indicates transmittance of light having a wavelength of 370 nm and $\tau_{380}$ indicates transmittance of light having a wavelength of 380 nm at a part of a lens where the thickness is 10 nm, the lens is the second in the fourth lens group when viewed from the object side $$0.02 < \tau_{370} < 0.2 \tag{1}$$

$$0.2 < \tau_{380} < 0.55 \tag{2}$$

4. The zoom lens according to claim 1, wherein a condition of the following Expression (7) is satisfied when $dsag_{2i1}$ indicates an aspheric amount at the 10% effective aperture of an $i\text{-}^{th}$ aspheric surface of the second lens group viewed from the object side, and $dsag_{2i9}$ indicates an aspheric amount at the 90% effective aperture of an $i\text{-}^{th}$ aspheric surface of the second lens group viewed from the object side $$-0.23 < dsag_{2i1}/dsag_{2i9} < -0.10 \tag{7}$$

5. The zoom lens according to claim 1, wherein the aspheric surface of the second lens group is a surface arranged closest to the image plane side, and the aspheric surface being the concave surface that faces the image plane side.

6. The zoom lens according to claim 1, wherein a condition of the following Expression (8) is satisfied when $dsag_{3i1}$ indicates an aspheric amount at the 10% effective aperture of an $i\text{-}^{th}$ aspheric surface of the third lens group viewed from the object side, and $dsag_{3i9}$ indicates an aspheric amount at the 90% effective aperture of an $i\text{-}^{th}$ aspheric surface of the third lens group viewed from the object side $$-0.24 < dsag_{3i1}/dsag_{3i9} < -0.15 \tag{8}$$

7. The zoom lens according to claim 1, wherein a condition of the following Expression (9) is satisfied when $dsag_{4i1}$ indicates an aspheric amount at the 10% effective aperture of an $i\text{-}^{th}$ aspheric surface of the fourth lens group viewed from the object side, and $dsag_{4i9}$ indicates an aspheric amount at the 90% effective aperture of an i-$^{th}$ aspheric surface of the fourth lens group viewed from the object side $$-0.45 < dsag_{4i1}/dsag_{4i9} < -0.13 \quad (9).$$

8. A video camera comprising a zoom lens, wherein the zoom lens used is according to claim 1.

9. A digital still camera comprising a zoom lens, wherein the zoom lens used is according to claim 1.

10. A zoom lens comprising:
a first lens group that is made of a lens having negative refractive power and a lens having positive refractive power, as well as a lens having positive refractive power, arranged in that order from an object side to an image plane side, the first lens group having an overall positive refractive power and being fixed with respect to an image plane;
a second lens group having an overall negative refractive power, a zoom operation being carried out by shifting the second lens group on an optical axis;
an aperture stop that is fixed with respect to the image plane;
a third lens group that is made of a lens having positive refractive power, as well as a lens having a positive refractive power and a lens having negative refractive power, arranged in that order from the object side to the image plane side, the third lens group having an overall positive refractive power and being fixed with respect to the optical axis direction when zooming or focusing; and
a fourth lens group that is made of a lens having positive refractive power, a lens having negative refractive power and a lens having positive refractive power, arranged in that order from the object side to the image plane side, the fourth lens group having an overall positive refractive power and being shifted on the optical axis so as to maintain the image plane that fluctuates when the second lens group is shifted on the optical axis and when the object moves, at a certain position from a reference plane;
wherein the second lens group is made of a concave meniscus lens, a concave lens, a double convex lens and a concave lens, arranged in that order from the object side to the image plane side, and includes at least one aspheric surface;
wherein the third lens group comprises a cemented lens having a cemented surface whose convex surface faces the image plane side, the third lens group can be shifted in a direction perpendicular to the optical axis in order to correct image fluctuations during camera shake, and includes at least one aspheric surface;
wherein the fourth lens group comprises at least one aspheric surface; and
wherein a condition of the following Expression (6) is satisfied when $f_{13}$ indicates a focal length of a third lens of the first lens group viewed from the object side, and $f_{132}$ indicates a focal length of a surface of the third lens of the first lens group facing the image plane viewed from the object side $$-2.5 < f_{132}/f_{13} < -1.5 \quad (6).$$

11. The zoom lens according to claim 10, wherein the fourth lens group is made of a convex lens, a concave lens and a convex lens, arranged in that order from the object side to the image plane side, and all of the lenses are cemented together.

12. The zoom lens according to claim 10, wherein the fourth lens group is made of three lenses and all of the lenses are cemented together, satisfying conditions of the following Expressions (1) and (2) when $\tau_{370}$ indicates transmittance of light having a wavelength of 370 nm and $\tau_{380}$ indicates transmittance of light having a wavelength of 380 nm at a part of a lens where the thickness is 10 nm, the lens is the second in the fourth lens group when viewed from the object side $$0.02 < \tau_{370} < 0.2 \quad (1)$$

$$0.2 < \tau_{380} < 0.55 \quad (2).$$

13. The zoom lens according to claim 10, wherein a condition of the following Expression (7) is satisfied when $dsag_{2i1}$ indicates an aspheric amount at the 10% effective aperture of an i-$^{th}$ aspheric surface of the second lens group viewed from the object side, and $dsag_{2i9}$ indicates an aspheric amount at the 90% effective aperture of an i-$^{th}$ aspheric surface of the second lens group viewed from the object side $$-0.23 < dsag_{2i1}/dsag_{2i9} < -0.10 \quad (7).$$

14. The zoom lens according to claim 10, wherein the aspheric surface of the second lens group is a surface arranged closest to the image plane side, and the aspheric surface being the concave surface that faces the image plane side.

15. The zoom lens according to claim 10, wherein a condition of the following Expression (8) is satisfied when $dsag_{3i1}$ indicates an aspheric amount at the 10% effective aperture of an i-$^{th}$ aspheric surface of the third lens group viewed from the object side, and $dsag_{3i9}$ indicates an aspheric amount at the 90% effective aperture of an i-$^{th}$ aspheric surface of the third lens group viewed from the object side $$-0.24 < dsag_{3i1}/dsag_{3i9} < -0.15 \quad (8).$$

16. The zoom lens according to claim 10, wherein a condition of the following Expression (9) is satisfied when $dsag_{4i1}$ indicates an aspheric amount at the 10% effective aperture of an i-$^{th}$ aspheric surface of the fourth lens group viewed from the object side, and $dsag_{4i9}$ indicates an aspheric amount at the 90% effective aperture of an i-$^{th}$ aspheric surface of the fourth lens group viewed from the object side $$-0.45 < dsag_{4i1}/dsag_{4i9} < -0.13 \quad (9).$$

17. A video camera comprising a zoom lens, wherein the zoom lens used is according to claim 10.

18. A digital still camera comprising a zoom lens, wherein the zoom lens used is according to claim 10.

* * * * *